US010851433B2

(12) United States Patent
Matsuzawa et al.

(10) Patent No.: US 10,851,433 B2
(45) Date of Patent: Dec. 1, 2020

(54) MANUFACTURING METHOD OF MECHANICAL COMPONENT USING MARTENSITIC STAINLESS STEEL, ROTATING DEVICE, ROLLING BEARING AND ROLLING BEARING UNIT

(71) Applicant: NSK LTD., Tokyo (JP)

(72) Inventors: Chikara Matsuzawa, Fujisawa (JP); Takafumi Yasuhara, Fujisawa (JP); Hiroshi Nishizawa, Fujisawa (JP); Norihiro Aoki, Fujisawa (JP); Koji Takano, Tokyo (JP); Masaru Kuge, Tokyo (JP)

(73) Assignee: NSK LTD., Tokyo (JP)

( * ) Notice: Subject to any disclaimer, the term of this patent is extended or adjusted under 35 U.S.C. 154(b) by 113 days.

(21) Appl. No.: 16/218,928

(22) Filed: Dec. 13, 2018

(65) Prior Publication Data
US 2019/0112686 A1    Apr. 18, 2019

Related U.S. Application Data

(62) Division of application No. 15/034,444, filed as application No. PCT/JP2014/080111 on Nov. 13, 2014, now Pat. No. 10,494,692.

(30) Foreign Application Priority Data

Nov. 13, 2013    (JP) .................................. 2013-235002

(51) Int. Cl.
*C21D 6/02*        (2006.01)
*C21D 9/00*        (2006.01)
(Continued)

(52) U.S. Cl.
CPC ................. *C21D 9/40* (2013.01); *C21D 1/18* (2013.01); *C21D 6/002* (2013.01); *C21D 6/02* (2013.01);
(Continued)

(58) Field of Classification Search
CPC ........ C21D 6/002; C21D 6/02; C21D 38/001; C21D 38/22; C21D 9/00; C21D 2211/008;
(Continued)

(56) References Cited

U.S. PATENT DOCUMENTS 3,595,643 A    7/1971  Boyce et al.
5,492,573 A    2/1996  Fukushima et al.
(Continued)

FOREIGN PATENT DOCUMENTS

CN    1664153 A    9/2005
CN    103298964 A    9/2013
(Continued)

OTHER PUBLICATIONS

Machine Translation of JP 2001-294987 A1 (Year: 2001).*
(Continued)

*Primary Examiner* — Christopher J Besler
(74) *Attorney, Agent, or Firm* — Sughrue Mion, PLLC

(57) ABSTRACT

A martensitic stainless steel containing, by mass %, C: 0.20% to 0.40%, N: 0.1% or less, Mo: 3% or less, and Cr: 12.0% to 16.0%, such that 0.3%≤C+N≤0.4% and a PI value (=Cr+3.3Mo+16N) is 18 or more, with the remainder being substantially Fe and unavoidable impurities is quenched from a temperature of 1,030° C. to 1,140° C. and subjected to a subzero treatment and tempering so as to obtain a prior austenite crystal grain size of a surface layer of 30 μm to 100 μm and a surface hardness of 58 HRc to 62 HRc.

2 Claims, 18 Drawing Sheets

(51) Int. Cl.
*F16C 33/32* (2006.01)
*F16C 33/62* (2006.01)
*F16C 33/64* (2006.01)
*F16C 19/06* (2006.01)
*C21D 9/40* (2006.01)
*C21D 1/18* (2006.01)
*C21D 6/00* (2006.01)
*C21D 6/04* (2006.01)
*C22C 38/00* (2006.01)
*C22C 38/22* (2006.01)

(52) U.S. Cl.
CPC .................. *C21D 6/04* (2013.01); *C21D 9/00* (2013.01); *C21D 2211/008* (2013.01); *C22C 38/00* (2013.01); *C22C 38/001* (2013.01); *C22C 38/22* (2013.01); *F16C 19/06* (2013.01); *F16C 33/32* (2013.01); *F16C 33/62* (2013.01); *F16C 33/64* (2013.01); *F16C 2204/72* (2013.01); *F16C 2240/48* (2013.01); *F16C 2316/13* (2013.01)

(58) Field of Classification Search
CPC .......... F16C 33/32; F16C 33/62; F16C 33/64; F16C 19/06
See application file for complete search history.

(56) References Cited

U.S. PATENT DOCUMENTS

| 5,873,956 A | 2/1999 | Tanaka et al. |
| 6,409,846 B1 | 6/2002 | Takemura et al. |
| 7,393,313 B2 | 7/2008 | Belcastro |
| 2002/0037120 A1 | 3/2002 | Tanaka et al. |
| 2010/0054649 A1 | 3/2010 | Yamada |
| 2012/0014626 A1 | 1/2012 | Watanabe |
| 2012/0118435 A1 | 5/2012 | Zurecki et al. |
| 2012/0169045 A1 | 7/2012 | Berghaus |
| 2013/0030361 A1 | 1/2013 | Astrand |
| 2013/0309126 A1 | 11/2013 | Jo et al. |

FOREIGN PATENT DOCUMENTS

| DE | 10 2011 111 493 A1 | 12/2012 |
| EP | 1 602 740 A1 | 12/2005 |
| EP | 2 159 295 A2 | 3/2010 |
| JP | 9-287053 A | 11/1997 |
| JP | 11-50203 A | 2/1999 |
| JP | 11-303874 A | 11/1999 |
| JP | 2001-294987 A | 10/2001 |
| JP | 2002-081451 A | 3/2002 |
| JP | 2003-213380 A | 7/2003 |
| JP | 2010-77525 A | 4/2010 |
| JP | 2014-114508 A | 6/2014 |

OTHER PUBLICATIONS

Machine Translation of JP H-1150203 A.*
International Search Report, issued by International Searching Authority in corresponding International Application No. PCT/JP2014/080111, dated Feb. 24, 2015 (PCT/ISA/210).
Written Opinion, issued by International Searching Authority in corresponding International Application No. PCT/JP2014/080111, dated Feb. 24, 2015 (PCT/ISA/237).
Office Action dated Dec. 16, 2016 issued by the State Intellectual Property Office of the People's Republic of China in counterpart Chinese Patent Application No. 201480062443.1.
Communication dated Oct. 20, 2016 issued by European Patent Office in counterpart European Application No. 14861768.1.
Communication dated May 8, 2019 issued by the United States Patent Office in Counterpart U.S. Appl. No. 15/034,444.
Communication dated Apr. 11, 2019 issued by the European Patent Office in counterpart European Application No. 18211955.2.

* cited by examiner

Divisional of 15/034,444

SCANNING ELECTRON MICROSCOPE IMAGE
OF Cr CARBONITRIDE MATERIAL

Divisional of 15/034,444

Divisional of 15/034,444

Divisional of 15/034,444

Divisional of 15/034,444

Divisional of 15/034,444
FIG.17
CASS TEST IN CONFORMITY WITH JIS Z 2371
| MATERIAL | PRESENT INVENTION | SUS440C |
|---|---|---|
| 50 HOURS |  | 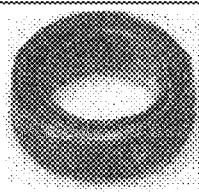 |
| 100 HOURS | 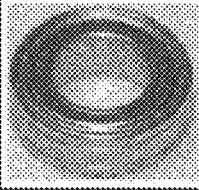 | 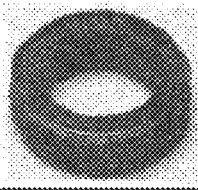 |
| 250 HOURS | 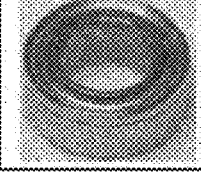 | 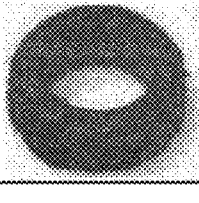 |
SPRAY LIQUID: SODIUM CHLORIDE(CONCENTRATION: 50±5g/L)
+ COPPER(II) CHLORIDE(CONCENTRATION: 0.205±0.015g/L)
pH = 3.1 to 3.3  TEMPERATURE: 50±2°C Divisional of 15/034,444

FIG.19

SALT WATER SPRAY TEST IN CONFORMITY WITH JIS Z 2371

| POLISHING | PERFORMED | NOT PERFORMED |
|---|---|---|
| 250 HOURS | 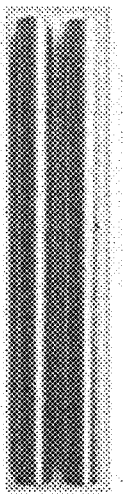 | 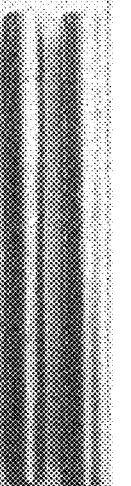 |

SPRAY LIQUID:SODIUM CHLORIDE(CONCENTRATION:50±5g/L)
pH = 6.5 to 7.2   TEMPERATURE:35±2°C

FIG.20

CASS TEST IN CONFORMITY WITH JIS Z 2371

| PASSIVATION | PERFORMED | NOT PERFORMED |
|---|---|---|
| 350 HOURS | 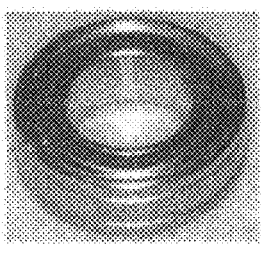 | 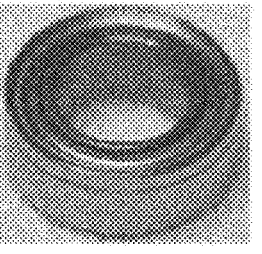 |

SPRAY LIQUID:SODIUM CHLORIDE(CONCENTRATION:50±5g/L)
- COPPER(II) CHLORIDE(CONCENTRATION:0.205±0.015g/L)
pH = 1.3 to 3.3   TEMPERATURE:50±2°C

Divisional of 15/034,444

Divisional of 15/034,444

MANUFACTURING METHOD OF MECHANICAL COMPONENT USING MARTENSITIC STAINLESS STEEL, ROTATING DEVICE, ROLLING BEARING AND ROLLING BEARING UNIT

CROSS REFERENCE TO RELATED APPLICATIONS

This application is a divisional of U.S. Ser. No. 15/034,444 filed May 4, 2016, which is a National Phase Application of PCT/JP2014/080111 filed Nov. 13, 2014, and claims benefit to Japanese Application 2013-235002, filed Nov. 13, 2013, the contents of each of which are incorporated herein by reference in their entirety.

TECHNICAL FIELD

The present invention relates to a manufacturing method of a mechanical component using a martensitic stainless steel having high surface hardness and excellent corrosion resistance.

The present invention also relates to a manufacturing method of a mechanical component using a martensitic stainless steel suitable for a shaft or a bearing used in a salt-water or corrosive environment.

BACKGROUND ART

Conventionally, it is known that addition of nitrogen is effective for enhancing corrosion resistance of a martensitic stainless steel, and in order to add a large amount of nitrogen to a martensitic stainless steel, there has been employed a method of pressurizing and dissolving high nitrogen by using a pressure induction furnace, etc. or holding the steel in a high-temperature nitrogen gas atmosphere for a long time, thereby allowing nitrogen to be absorbed from the surface to the inside of a material.

For this purpose, introduction of an expensive melting furnace or a manufacturing process for impregnation with nitrogen is needed.

In order to achieve nitrogen permeation from the surface to the inside of a finished component, the component needs to stored in a high-temperature nitrogen atmosphere for a long time, and this method is mainly targeted at a thin plate-like material and has a problem, for example, that application to a thick component, etc. is difficult.

Further, in the case of a martensitic stainless steel used for a mechanical component such as rolling bearing, it is known that refining of the microstructure is performed so as to obtain high hardness, good rust prevention effect and excellent acoustic properties (quietness).

Patent Document 1 discloses that when C is contained in an amount of more than 0.6% so as to increase the hardness of a high Cr stainless steel, eutectic carbide larger than 10 μm is formed due to large amounts of Cr and C, and the hardness and corrosion resistance are thereby reduced. However, the properties can be improved by appropriately blending alloy elements to refine the eutectic carbide and suppressing the production of δ ferrite.

Patent Document 2 discloses that the strength and toughness can be enhanced by incorporating from 0.1 to 0.2% of W, despite decreasing C compared with SUS440C to a range of 0.35 to 0.45%, and the surface hardness after heat treatment can be made HRc 60 or more by specifying the content of C+N to satisfy $0.60 \leq (C+N) \leq 0.65$. Further, it is stated that quenchability can be improved by the addition of B and high strength can be obtained by the precipitation of BN.

Patent Document 3 discloses that refinement of the crystal grain size of a martensitic stainless steel to about 30 μm or less can be realized by producing carbonitride to perform pinning. It is stated that a martensitic stainless steel having high surface hardness, high corrosion resistance and high toughness can be obtained by limiting the amounts of precipitates and the martensitic stainless steel can be assured of a Vickers hardness of 550 HV or more.

PRIOR ART DOCUMENT

Patent Document

Patent Document 1: JP-A-H9-287053 ([0008], [0024] and [0050])

Patent Document 2: JP-A-2010-77525 ([0013] and [0034])

Patent Document 3: JP-A-H11-50203 ([0005], [0009] and [0016])

SUMMARY OF THE INVENTION

Problem to be Solved by the Invention

In the high Cr stainless steel disclosed in Patent Document 1, eutectic carbide is refined and utilized to suppress the growth of a crystal grain for refining the crystal grain size.

However, this steel has a problem that due to production of δ ferrite, application to usage requiring particularly high corrosion resistance is difficult.

More specifically, as a result of refining of the crystal grain, the interface length (area) per unit area (unit volume) becomes large.

It is highly likely that in the interface portion, eutectic carbide is present and the Cr concentration is decreased to provide an origin of rust formation.

The corrosion resistance is difficult to be enhanced due to a synergistic effect of the interface length and the decrease in the Cr concentration.

In the martensitic stainless steel disclosed in Patent Document 2, the C content is from 0.35 to 0.45 and set to be lower than that of SUS440C but satisfies $0.6 \leq C+N \leq 0.65$, and thus, the N content is large.

A martensitic stainless steel usually takes a δ ferrite structure when solidified and has low nitrogen solubility, and the limit of the solubility is supposed to be usually about 0.1%. N that is not dissolved as solid solution has a problem of readily generating a blow hole.

A blow hole reaching the surface can be easily detected, but in the case of existing in the inside, the blow hole needs to be probed with ultrasound, etc., causing a problem, for example, that the control of manufacturing quality of components becomes cumbersome.

The martensitic stainless steel disclosed in Patent Document 3 is configured to have a surface hardness of Hv≥550, but in the case of application to a mechanical component, for example, a rolling bearing, etc., the hardness needs to be approximately from 58 HRc to 62 HRc, and thus, further higher hardness is required.

The present invention has been made to solve the above-described problems, and an object of the present invention is to provide a manufacturing method of a mechanical component using a martensitic stainless steel having high hardness and high corrosion resistance, and to provide a rotating device using a mechanical component manufactured by the above manufacturing method.

Means for Solving the Problem

In order to attain the above-described object, the present invention provides a manufacturing method of a mechanical component made of a martensitic stainless steel having high hardness and high corrosion resistance, the method comprising: a step of preparing a martensitic stainless steel containing, by mass %, C: 0.20% to 0.40%, N: 0.1% or less, Mo: 3% or less, and Cr: 12.0% to 16.0%, such that $0.3\% \leq C+N \leq 0.4\%$ and a PI value ($=Cr+3.3\,Mo+16N$) is 18 or more, with the remainder of substantially Fe and unavoidable impurities, a step of quenching from a temperature of 1,030 to 1,140° C., a step of subzero treatment, and a step of tempering, so as to obtain a prior austenite crystal grain size of a surface layer of 30 μm to 100 μm and a surface hardness of 58 HRc to 62 HRc. The surface layer indicates, for example, a range of about 0.2 mm from the surface.

According to this manufacturing method, although a crystal grain grows, since C and N surely dissolve as solid solution in the base, the production of carbonitride is suppressed and the crystal grain is kept from growing and being refined, so that the interface length per unit area can be made short.

Assuming that the possibility of rust formation at the interface is in the same degree per unit length (area), the possibility of rust formation is considered to decrease as the interface length is shorter.

For this reason, the corrosion resistance can be enhanced as compared with a case where the crystal grain is refined.

Further, the PI (Pitting Index=$Cr+3.3\,Mo+16N$) value is set to 18 or more and since quenching is performed from a temperature of 1,030 to 1,140° C., a Cr deficiency around the interface due to fine Cr carbide often produced at a quenching temperature lower than the range above or reduction in the pitting potential due to δ ferrite produced at a quenching temperature higher than the range above is surely suppressed, whereby a pitting potential corresponding to the PI value can be obtained and corrosion resistance can be ensured.

The crystal grain grows in the step of quenching, so that the crystal grain size of the surface layer can be from 30 μm to 100 μm.

Incidentally, a material is usually annealed for machining and when the average size of Cr carbonitride in the material is less than 5 μm, this is suitable for obtaining a product with high precision, because carbide can be prevented from not dissolving as solid solution at the time of quenching and martensite transformation progresses at a substantially uniform temperature, making it possible to reduce deformation.

A subzero treatment is performed following the step of quenching. In this step, retained austenite can be surely reduced. It is known that when the carbon amount is increased to raise the hardness, the end temperature (Mf) at which martensite transformation is completed is lowered and retained austenite is present even at ordinary temperature. By performing the subzero treatment, the retained austenite is reduced, so that occurrence of martensite transformation at ordinary temperature can be prevented. As a result, reduction in the hardness can be prevented, and a mechanical component formed of a high-hardness martensitic stainless steel can be manufactured.

In this connection, when occurrence of martensite transformation at ordinary temperature can be prevented, a dimensional change over time is reduced, so that stabilization of the mechanical component can be realized.

Next, in the step of tempering, strain is removed and toughness is imparted, whereby a mechanical component formed of a high-hardness, highly corrosion-resistant martensitic stainless steel having a surface hardness of 58 HRc to 62 HRc can be realized.

In addition, the manufacturing method may further comprise a step of enhancing a plane roughness by grinding, polishing, or the like, subsequent to the step of heat treatment.

This step can enhance the plane roughness of the mechanical component and reduce the actual surface area.

Accordingly, as with the interface length above, the possibility of rust formation can be decreased, and a mechanical component having higher corrosion resistance can be realized.

Further, the manufacturing method may further comprise a step of forming an oxide layer on a surface, subsequent to the step of heat treatment or the step of enhancing the plane roughness. By this step, a thick film compared with a Cr oxide layer produced in an ordinary air environment can be produced, and a mechanical component formed of a highly corrosion-resistant martensitic stainless steel can be realized.

The mechanical component manufactured by the manufacturing method according to any one of claims 1 to 3 is a rotating device, and the corrosion resistance is enhanced to enable the rotating device to be exposed to a corrosive environment.

The rotating device may be a handpiece bearing, or the like.

According to the configuration above, the corrosion resistance of a rolling bearing using the stainless steel can be enhanced, and the corrosion resistance as a rotating device having incorporated thereinto this bearing can be more enhanced than before.

In the rotating device, the corrosive environment may be sterilization with free chlorine. According to this configuration, sterilization with free chlorine can be performed, in addition to steam sterilization, and a rotating device capable of coping with a corrosive environment can be realized. Thus, the latitude in the design of the rotating device can be enhanced as well.

The mechanical component manufactured by the manufacturing method according to any one of claims 1 to 3 is a rolling bearing, at least one of an inner ring, an outer ring and a rolling element of the rolling bearing is manufactured by the manufacturing method.

In the rolling bearing, the corrosive environment may be sterilization with free chlorine. According to this configuration, sterilization with free chlorine can be performed, in addition to steam sterilization, and a rolling bearing capable of coping with a corrosive environment can be realized. Thus, the latitude in the design of the rolling bearing can be enhanced as well.

The rolling bearing may be, for example, a handpiece bearing such as dental handpiece bearing.

Further, there is provided a rolling bearing unit where at least one of a housing, a rolling bearing and a shaft member is manufactured by the manufacturing method according to any one of claims 1 to 3. The corrosion resistance of the rolling bearing unit can be enhanced.

Effects of the Invention

As described above, in order to attain the object, there is provided a manufacturing method comprising a step of preparing a martensitic stainless steel containing, by mass %, C: 0.20% to 0.40%, N: 0.1% or less, Mo: 3% or less, and Cr: 12.0% to 16.0%, such that 0.3%≤C+N≤0.4% and the PI value (=Cr+3.3 Mo+16N) is 18 or more, with the remainder of substantially Fe and unavoidable impurities, a step of quenching from a temperature of 1,030 to 1,140° C., and a step of tempering. Through these steps, a mechanical component formed of a high-hardness, highly corrosion-resistant martensitic stainless steel where the prior austenite crystal grain size of the surface layer is 30 μm to 100 μm and the surface hardness (hereinafter, simply referred to as hardness) is 58 HRc to 62 HRc, can be manufactured.

BRIEF DESCRIPTION OF THE DRAWINGS

FIG. 17 shows a photograph of results of a corrosion resistance test (CASS) according to the first embodiment of the present invention.

FIG. 19 shows a photograph of results of a corrosion resistance test according to a second embodiment of the present invention.

FIG. 20 shows a photograph of results of a corrosion resistance test according to a third embodiment of the present invention.

DESCRIPTION OF EMBODIMENTS

Figure 1:
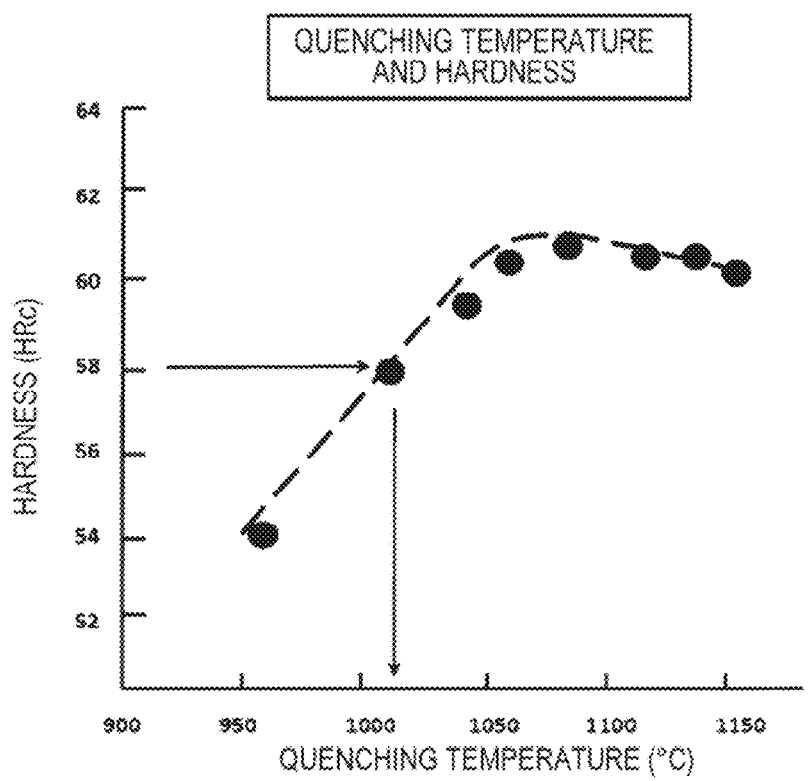
FIG. 1 is a characteristic diagram showing the quenching temperature and the hardness according to a first embodiment of the present invention.

A mechanical component made of a martensitic stainless steel according to the present invention aims at obtaining high hardness and high corrosion resistance.

Examples of the mechanical component include a component undergoing a relative motion, such as rolling bearing, sliding bearing, guide rail, linear guide, ball screw, shaft and flange, a wall material exposed to a highly physically corrosive environment, e.g., in salt water or a steam environment, a component such as masking shield and deck material, a container component used, e.g., in a food-related container or process machine and capable of withstanding against a chemical attack such as salt or vinegar contained in miso, soy sauce, etc., a pump used, e.g., as auxiliary machines of a fuel cell, etc. where formic acid, a highly reactive intermediate product, etc. are contained, and a flow passage component. Further, when used for, e.g., a member encountering a problem with contamination by body fluid or blood in medical usage, etc. or a component requiring sterilization in an autoclave, etc., the enhancement of corrosion resistance is realized.

The composition of the martensitic stainless steel for use in the present invention are described below. C is a main component necessary for increasing the hardness after heat treatment and is added in an amount of 0.2% or more so as to ensure HRc 58 or more in Vickers hardness after heat treatment. However, if added in excess of 0.4%, a coarse grain boundary carbide is precipitated to deteriorate the corrosion resistance. For this reason, the content of C is 0.4% or less.

Cr is a component for obtaining corrosion resistance and is added in an amount of 12.0% to 16.0%. If the content thereof is less than 12.0%, good corrosion resistance is not obtained, whereas if it exceeds 16.0%, δ ferrite comes to exist. When δ ferrite exists, Cr carbide precipitates at the grain boundary interface, and a region with a low Cr concentration is conversely generated to reduce the corrosion resistance. For this reason, the content of Cr is 16.0% or less so as not to allow for existence of δ ferrite. Incidentally, with a high Cr concentration, the temperature (Ms) at which martensite transformation starts is lowered, and sufficient quenching may not be achieved. A measure capable of coping therewith is to perform a subzero treatment after the quenching step.

N is added to secure a Vickers hardness of HRc 58 or more for the surface layer of the martensitic stainless steel. In addition, N constitutes a passive film resulting from nitridation of the surface, and the corrosion resistance on the surface can thereby be enhanced. Further, this component restrains the precipitation of Cr carbide, so that sensitization can also be suppressed.

However, if added in excess of 0.1%, N cannot dissolve as solid solution at the time of solidification, and a blow hole or a void is readily produced. For this reason, the content of N is 0.1% or less.

Mo is an element providing functional enhancement of the passive film and assists in the self-repair of Cr oxide film, and the corrosion resistance can thereby be increased. In addition, this component can increase the tempering softening resistance, but if added in excess of 3.0%, δ ferrite is produced to not only deteriorate the corrosion resistance but also reduce the workability, etc. For this reason, the content of Mo is 3.0% or less.

First Embodiment

Figure 2:
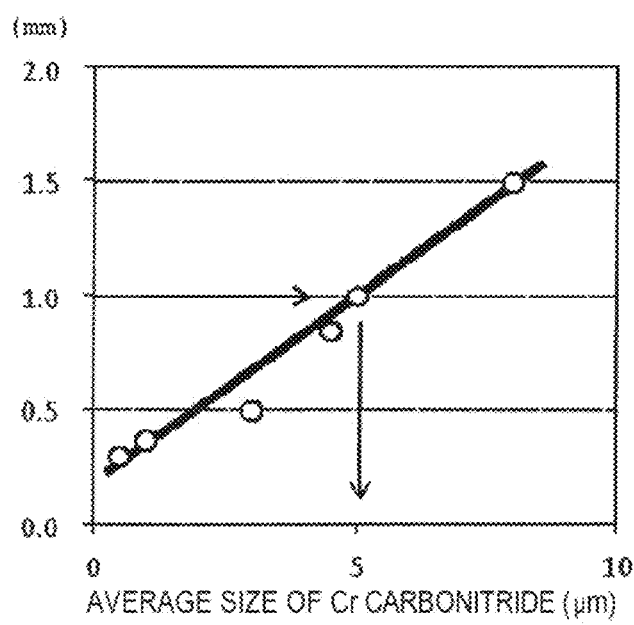
FIG. 2 is a view showing the effect of the average size of the Cr carbonitride material on the deformation amount at the time of quenching according to the first embodiment of the present invention.
Figure 3:
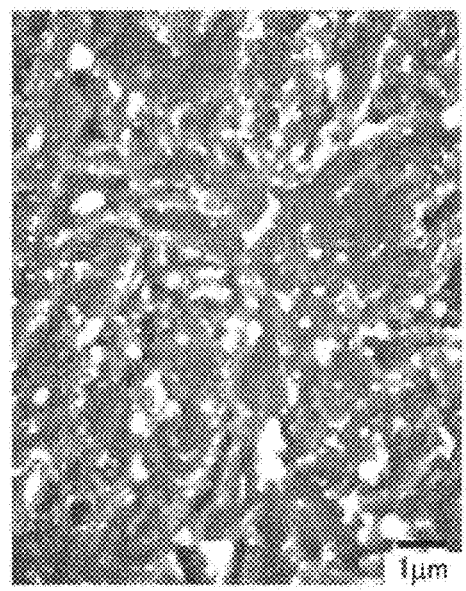
FIG. 3 is a scanning electron microscope image of Cr carbonitride as a representative material according to the first embodiment of the present invention.
Figure 4:
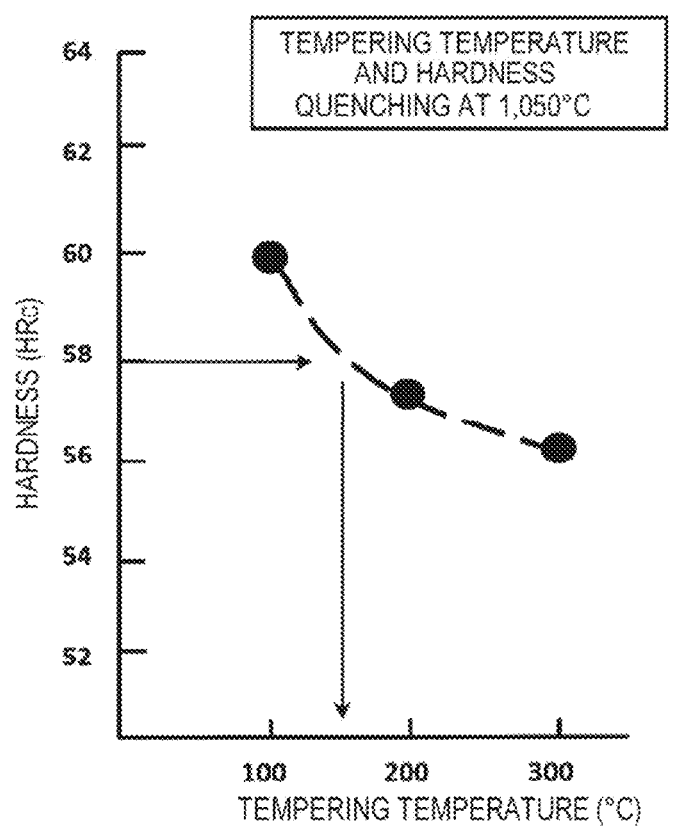
FIG. 4 is a characteristic diagram showing the tempering temperature and the hardness according to the first embodiment of the present invention.
Figure 5:
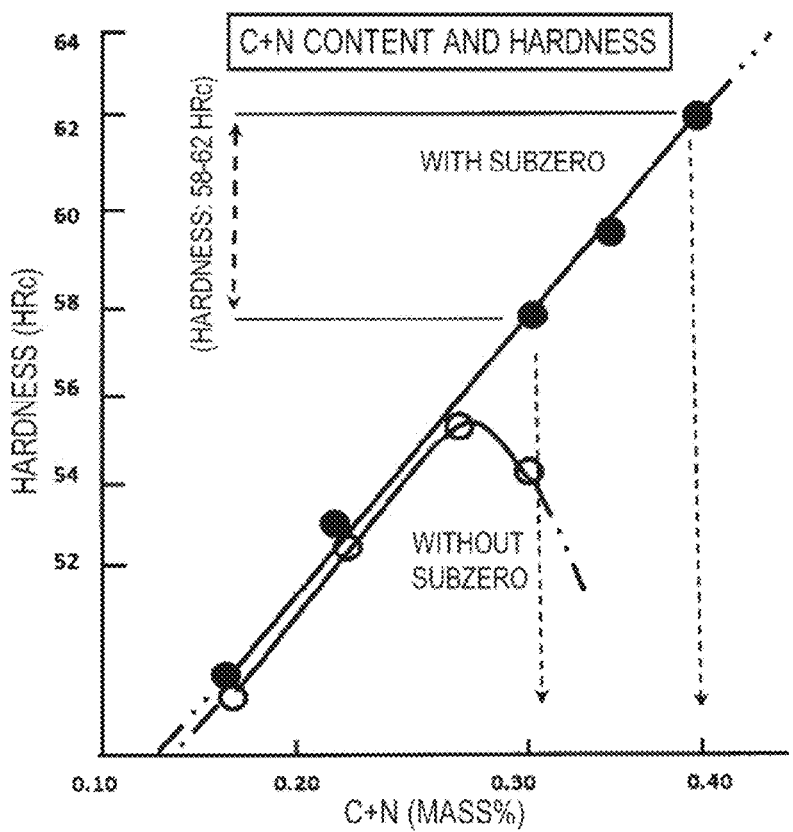
FIG. 5 is a characteristic diagram showing the C+N content and the hardness according to the first embodiment of the present invention.
Figure 6:
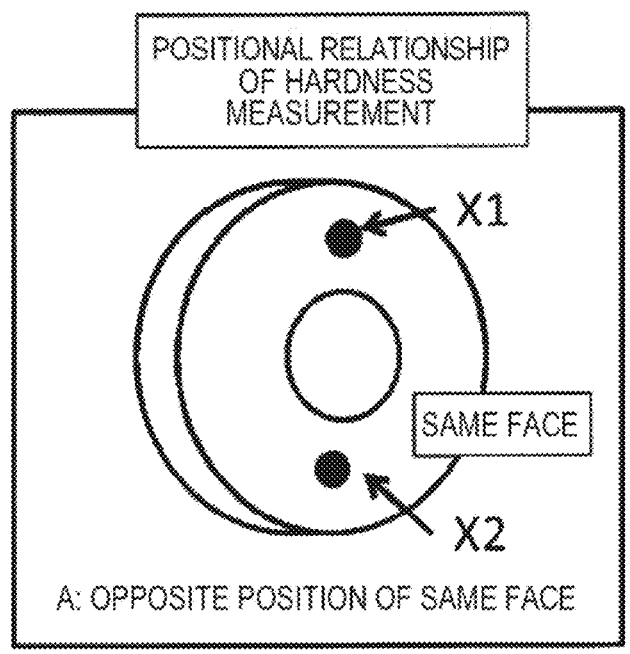
FIG. 6 is a schematic diagram showing the portions where the hardness is measured according to the first embodiment of the present invention.

An embodiment of the present invention is described below by referring to the drawings. First, quenching in the heat treatment is described. FIG. 1 is a characteristic diagram showing the quenching temperature and the hardness according to a first embodiment of the present invention; FIG. 2 is a view showing the effect of the average size of the Cr carbonitride material on the deformation amount at the time of quenching; FIG. 3 is a scanning electron microscope (SEM) image of Cr carbonitride as a representative material; and FIG. 4 is a characteristic diagram showing the tempering temperature and the hardness according to the first embodiment of the present invention. FIG. 5 is a characteristic diagram showing the C+N content and the hardness according to the first embodiment of the present invention, and FIG. 6 is a schematic diagram showing the portions where the hardness is measured according to the first embodiment of the present invention. The main components of the composition of the martensitic stainless steel sample used in this evaluation are C: 0.28%, N: 0.08%, Mo: 2.09%, and Cr: 13.5%.

In FIG. 1, the relationship between the quenching temperature and the Vickers hardness when changing the quenching temperature as regards the martensitic stainless steel of the present invention is plotted. According to FIG. 1, in the case where the quenching temperature is 950° C. or more, with a rise of the quenching temperature, the Vickers hardness (HRc) monotonously increases. The rise of the hardness shows a peak at around 1,075° C. and thereafter, the hardness gently lowers. As an example of the hardness, an arrow is affixed to the position of HRc 58 conforming to the range of 58 to 62 HRc which is often employed in a rolling bearing, etc., and it is understood that the lower limit value of the corresponding quenching temperature needs to be 1,030° C.

In FIG. 2, the effect of the average size of the Cr carbonitride material on the deformation (bending) when a straight shaft sample of about 300 mm in length is quenched from a temperature of 1,030° C. is depicted. One end of the sample shaft after quenching is slowly rotated, and the total runout (T.I.R (Total Indicator Reading)) of the other end is plotted. If the average size of the Cr carbonitride is not less than 5 μm, the maximum runout becomes 1 mm or more, and an excessive increase in the deformation amount occurs at the time of quenching, as a result, post-working is required, and the polishing cost rises. For this reason, the maximum runout is preferably 1 mm or less. FIG. 3 shows an electron micrograph of Cr carbonitride as a representative material. The material is buried at a longitudinal cross-section, subjected to mirror polishing and electrolytic etching (in a nonaqueous solution, for example, 3% of maleic acid+1% of tetramethylammonium chloride+balance being methanol), and then observed by a scanning electron microscope, whereby the photograph is obtained. The white spherical or bar-like contrast is Cr carbonitride. The average size above is preferred, because when the Cr carbonitride material becomes large, the Cr carbonitride does not dissolve as solid solution at the time of quenching, and the concentrations of Cr, C, N, etc. in the matrix are changed, as a result, the martensite transformation temperature varies depending on the region of sample.

Next, tempering is performed, because the martensitic stainless steel in the quenched state lacks the toughness. In FIG. 4, the evaluation is performed also by using a sample having the same composition as that evaluated for the quenching characteristics. The relationship between the tempering temperature and the Vickers hardness when the martensitic stainless steel of the present invention is quenched at 1,050° C. shown in FIG. 1 and thereafter, the tempering temperature is changed, is plotted. In FIG. 4, with a rise of the tempering temperature, the Vickers hardness (HRc) monotonously decreases. Similarly to FIG. 1, an arrow is affixed to the position of HRc 58, and it is understood that the upper limit value of the corresponding tempering temperature is sufficient if it is about 150° C.

FIG. 5 is a characteristic diagram showing the C+N content and the hardness according to the first embodiment of the present invention. The quenching temperature is set to 1,050° C., and the tempering temperature is set to 150° C. In addition, as a subzero treatment following the quenching, an experiment is performed at 2 levels of performing a subzero treatment with dry ice and not performing the subzero treatment. As to the subzero treatment, a treatment at a very low temperature of about −200° C. with liquefied nitrogen, and a treatment at a relatively high temperature of about −80° C. with dry ice, are known, but in this embodiment, a subzero treatment with dry ice is used. In FIG. 5, the hardness when the subzero treatment is performed is plotted as a black dot (•), and the hardness when the subzero treatment is not performed is plotted as a white dot (○). It is known that the Vickers hardness (HRc) of this type of martensitic stainless steel can be ordered by C+N.

As the approximate expression of contribution of C and N to the Vickers hardness, various approximate expressions have been proposed. For example, there are known approximate expression (1): $\alpha 1+\beta 1*\sqrt{C}$ ($\alpha 1$ and $\beta 1$ are fixed numbers) where the contribution is proportional to the square root of the C concentration; approximate expression (2): $\alpha 2+\beta 2*\sqrt{(C+N/\gamma 1)}$ ($\alpha 2$, $\beta 2$ and $\gamma 1$ are fixed numbers) where the contribution of C is approximately two or three times higher than that of N; and approximate expression (3): $\alpha 3+\beta 3*(C+N)$ ($\alpha 3$ and $\beta 3$ are fixed numbers) where the contribution is linear with respect to (C+N).

In the case of not performing the subzero treatment, the Vickers hardness linearly rises with an increase in (C+N) but after the peak at about 0.26%, lowers. On the other hand, when the subzero treatment is performed, it was confirmed that the hardness is linearly increased until (C+N) of 0.4%. Accordingly, in the present invention, the linear approximation of approximate expression (3) fits well. By performing the subzero treatment, even when (C+N) is from 0.2% to 0.4%, generation of retained austenite (retained γ) is suppressed, and the hardness rises according to (C+N).

It is understood from FIG. 5 that when the content of (C+N) is from 0.3% to 0.4%, a hardness of 58 HRc to 62 HRc is obtained.

FIG. 6 is a schematic diagram showing the portions where the hardness is measured according to the first embodiment of the present invention. In this hardness measurement, in consideration of a ring of a rolling bearing, a ring-like disc (thickness: 4 mm) having an outer diameter (φ10 mm), in which a hole (φ4 mm) corresponding to the inner diameter is opened in the center, is used. The hardness is measured by Microvickers at axisymmetric positions each in the center portion (on a circumference of φ7 mm) between the outer and inner diameters on the same-side surface of the disc and then converted to Rockwell C scale (HRc).

Figure 7:
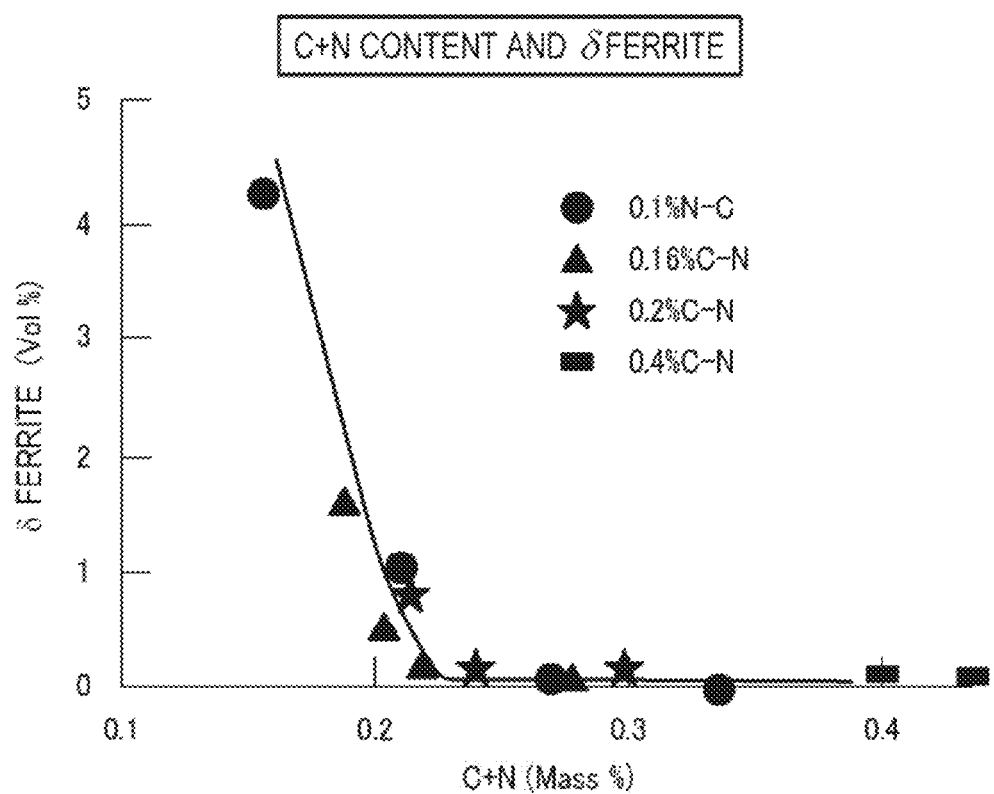
FIG. 7 is a characteristic diagram showing the C+N content and the amount of δ ferrite according to the first embodiment of the present invention.
Figure 8:
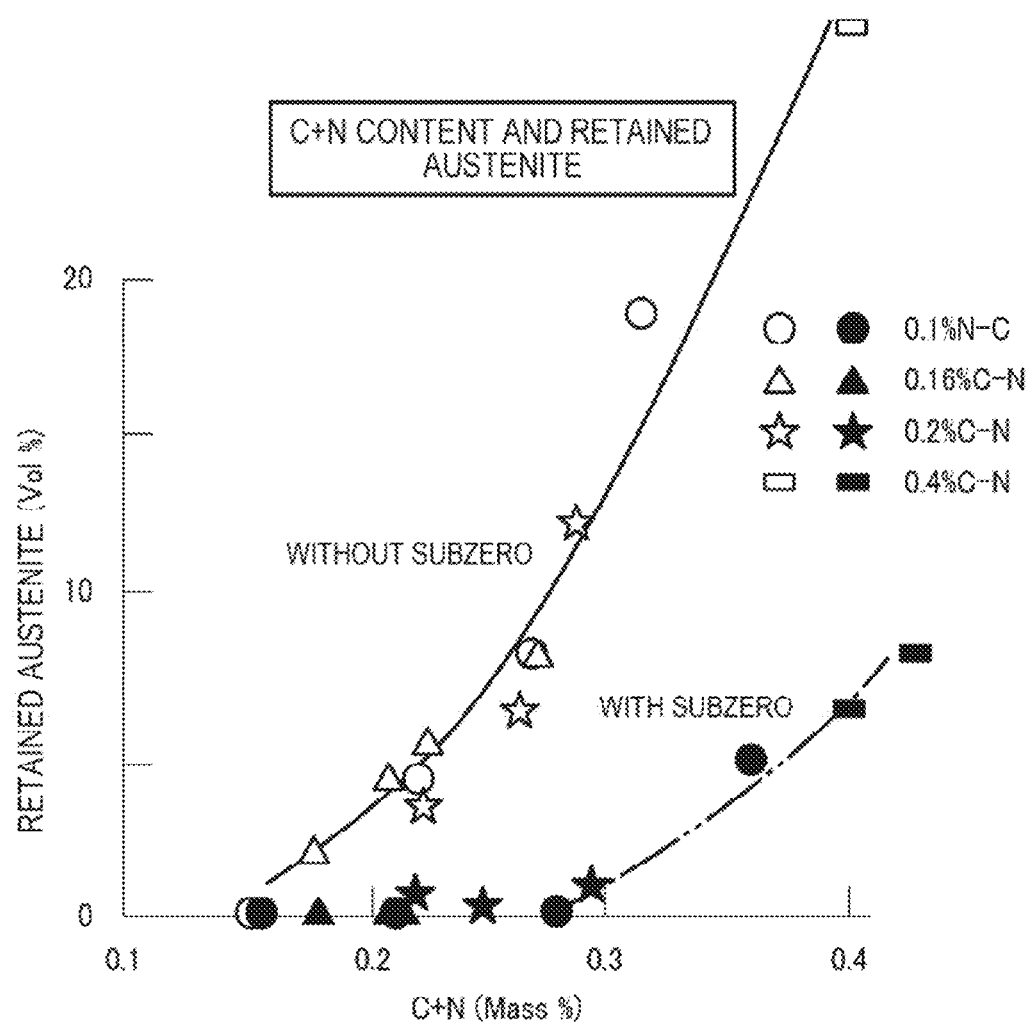
FIG. 8 is a characteristic diagram showing the C+N content and the amount of retained austenite according to the first embodiment of the present invention.

With respect to the mechanical component manufactured in the present invention, the relationship between the retained austenite affecting the hardness or the abundance of δ ferrite affecting the corrosion resistance and (C+N) is examined in more detail, and the results are shown in FIGS. 7 and 8. FIG. 7 is a characteristic diagram showing the (C+N) content and the amount of δ ferrite according to the first embodiment of the present invention.

In the figure, the circle mark (•) plots (C+N) and the value of volume % (Vol %) of δ ferrite when N is fixed at 0.1% and C is changed; the triangle mark (▲) plots (C+N) and volume % (Vol %) of δ ferrite when C is fixed at 0.16% and N is changed; the star mark (*) plots (C+N) and volume % (Vol %) of δ ferrite when C is fixed at 0.2% and N is changed; and the square mark (■) plots (C+N) and volume % (Vol %) of δ ferrite when C is fixed at 0.4% and N is changed.

When a δ ferrite estimation line is drawn on respective measurement points for facilitating the understanding, it is understood that δ ferrite monotonously decreases along the increase of (C+N) and in the region of 0.3% or more, δ ferrite is not present.

If δ ferrite exists, Cr carbide ($M_{23}C_6$: here, M is Cr) precipitates in the grain boundary interface portion to reduce the Cr concentration and highly probably provide an origin of rust formation, and therefore, it may be important to restrain its generation.

FIG. 8 is a characteristic diagram showing the C+N content and the amount of retained austenite according to the first embodiment of the present invention.

Similarly to FIG. 7, the circle mark (○ and •) in the figure plots (C+N) and volume % (Vol %) of retained austenite when N is fixed at 0.1% and C is changed; the triangle mark (Δ and ▲) in the figure plots (C+N) and volume % (Vol %) of retained austenite when C is fixed at 0.16% and N is changed; the star mark (☆ and *) in the figure plots (C+N) and volume % (Vol %) of retained austenite when C is fixed at 0.2% and N is changed; and the square mark (□ and ■) in the figure plots (C+N) and volume % (Vol %) of retained austenite when C is fixed at 0.4% and N is changed. Incidentally, the unfilled plots (○, Δ, ☆, □) indicate the case where the subzero treatment is not performed, and the filled plots (•, ▲, *, ■) indicate the case where the subzero treatment with dry ice is performed.

Again, similarly to FIG. 7, for facilitating the understanding, estimation lines are added respectively to unfilled plots (○, Δ, ☆, □) and filled plots (•, ▲, *, ■) according to the presence or absence of the subzero treatment. It is understood from these that retained austenite monotonously increases along the increase of (C+N). In the case of not performing the subzero treatment, the retained austenite monotonously increases in the range of (C+N) of 0.15% or more, but by performing the subzero treatment, not only generation of retained austenite can be surely restrained until (C+N) of 0.3% but also generation of retained austenite can be restrained even at (C+N) of 0.4% and in addition to realizing a hardness of 58 to 62 HRc, the retained austenite can be reduced to about 7% which is lower than 10% that is considered to scarcely exert an adverse effect.

Next, as for rust formation, the way of thinking about enhancement of corrosion resistance in the present invention is described in relation to the crystal refinement and the interface. It is known that, regarding rust formation, when δ ferrite exists in the grain boundary of prior austenite crystal grains, Cr carbide precipitates at the grain boundary interface to reduce the Cr concentration and on the occasion of the production of a Cr deficiency layer, rust formation easily occurs.

Figure 9A:
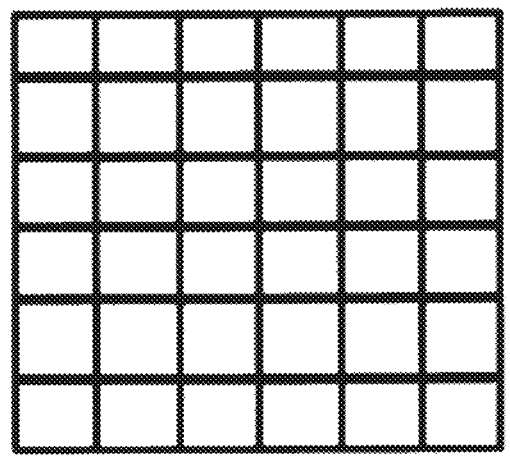
FIG. 9A is a schematic diagram for explaining the crystal grain and the grain boundary according to the first embodiment of the present invention.
Figure 9B:
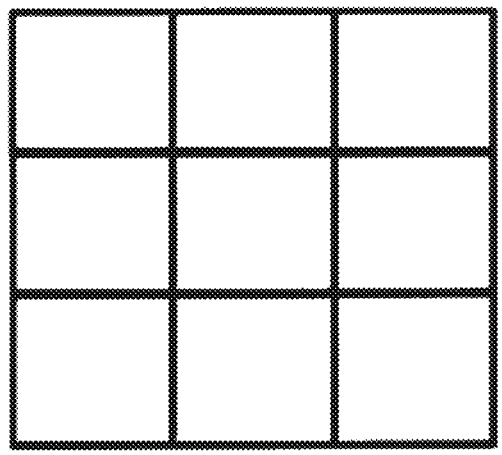
FIG. 9B is a schematic diagram for explaining the crystal grain and the grain boundary according to the first embodiment of the present invention.
Figure 10A:
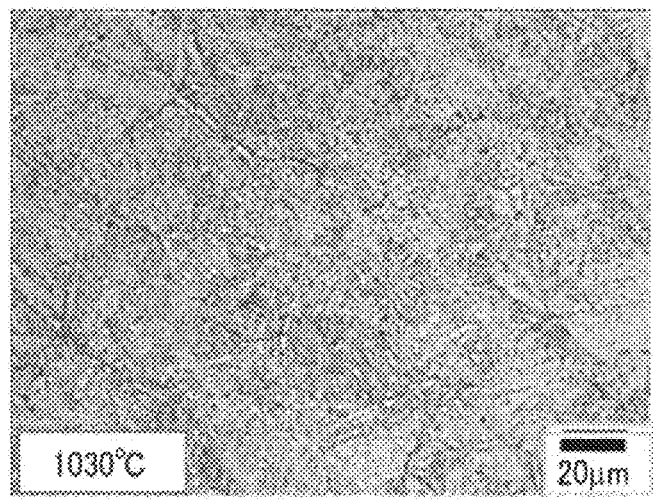
FIG. 10A shows a quenching temperature and a microstructure photograph according to the first embodiment of the present invention.
Figure 10B:
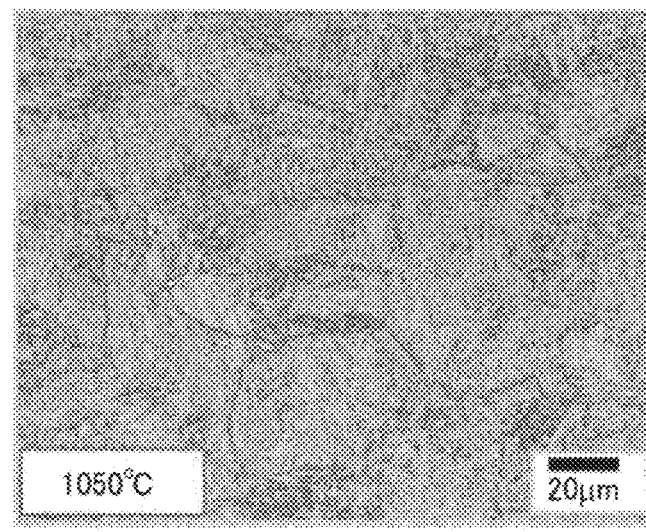
FIG. 10B shows a quenching temperature and a microstructure photograph according to the first embodiment of the present invention.
Figure 10C:
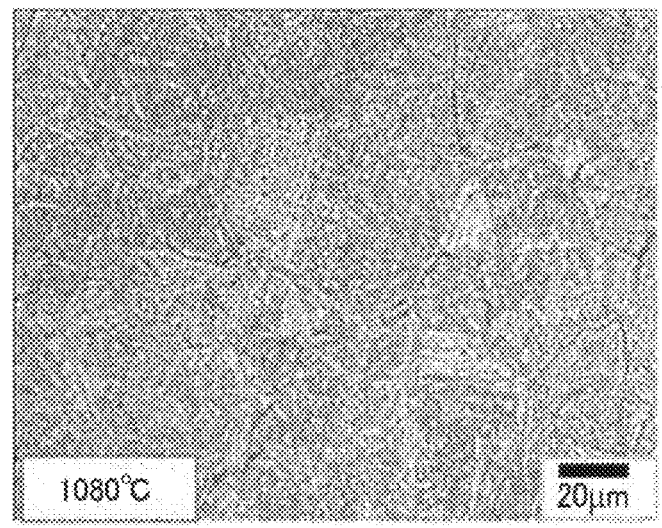
FIG. 10C shows a quenching temperature and a microstructure photograph according to the first embodiment of the present invention.
Figure 10D:
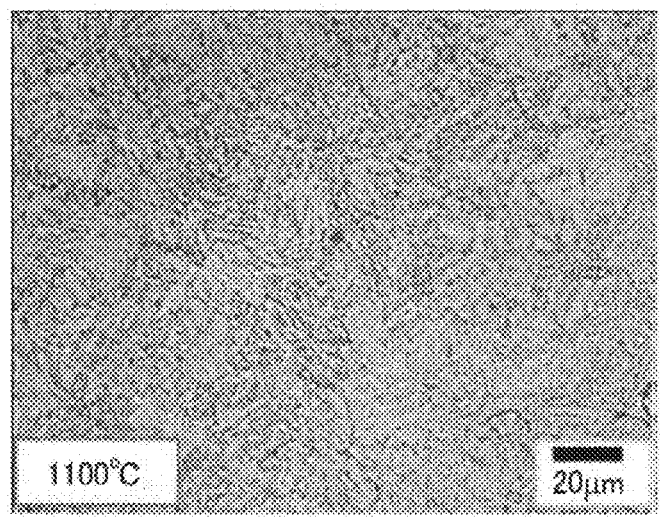
FIG. 10D shows a quenching temperature and a microstructure photograph according to the first embodiment of the present invention.
Figure 10E:
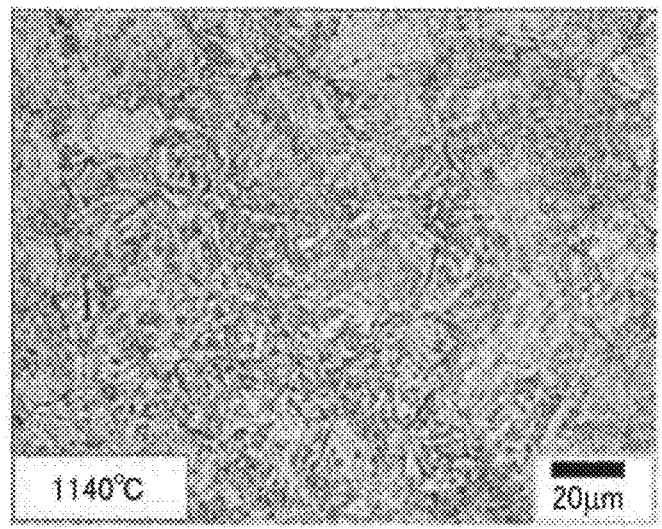
FIG. 10E shows a quenching temperature and a microstructure photograph according to the first embodiment of the present invention.

Therefore, the length of the grain boundary having a high likelihood of providing an origin of rust formation is described by referring to FIGS. 9A and 9B.

FIGS. 9A and 9B are discussed, assuming a square portion with one side length being a unit length L in the martensitic stainless steel. In FIG. 9A, the crystal grain is small, and the one side length is ⅙ of the unit length L. In FIG. 9B, the crystal grain is large, and the one side length is ⅓ of the unit length L. That is, these crystal grains have a relationship that the size of one side is doubled or halved. In FIG. 9A where the crystal grain is small, the interface length in the longitudinal direction is 6 times the unit length L, i.e., 6*L, and the length in the transverse direction is similarly 6*L. Accordingly, the grain boundary interface length as the sum of longitudinal and transverse lengths is 12*L.

On the other hand, in FIG. 9B where the crystal grain is large, both of longitudinal and transverse lengths determined in the same manner are 3*L. Accordingly, the grain boundary interface length as the sum of longitudinal and transverse lengths is 6*L and thus, the interface length becomes half. In other words, when the crystal grain is larger, the grain boundary interface length is shorter.

The grain boundary of prior austenite crystal grains provides an origin of rust formation and allows rust formation to proceed therein, and it is understood that assuming that the probability of providing an origin of rust formation is at the same level, a larger crystal grain can reduce the probability of rust formation. Although a simple comparison of lengths is performed on a flat plane, since the crystal grain is cubic, comparison by the sum total of surface areas is considered to be more realistic. That is, because of the homothetic ratio being 2:1, when compared by the area, the homothetic ratio is squared, and it is considered that a difference by about 4 times is likely to be produced in the probability of rust formation. Accordingly, refinement of the microstructure may be also important to improvement of properties, but as concerns the rust, since the grain boundary is estimated to provide an origin of rust formation, refining is thought to be not necessarily a good approach. In other words, control for keeping dissolved as solid solution in the base so as not to allow for precipitation of Cr carbide may be considered to be important.

Figure 11A:
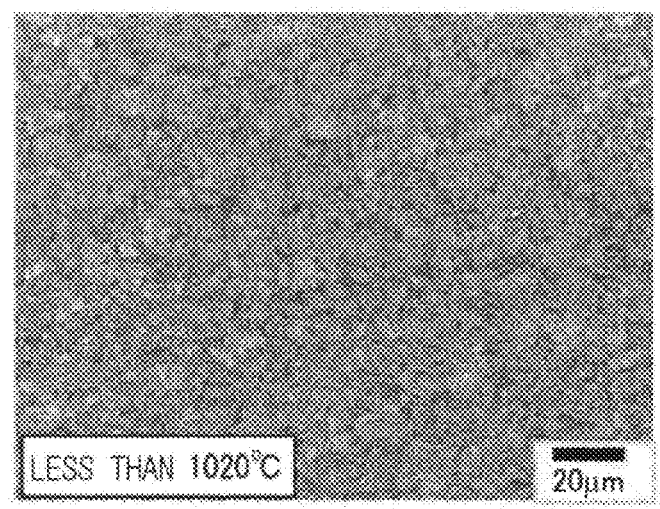
FIG. 11A shows a microstructure photograph when quenched at a lower temperature than the first embodiment of the present invention.
Figure 11B:
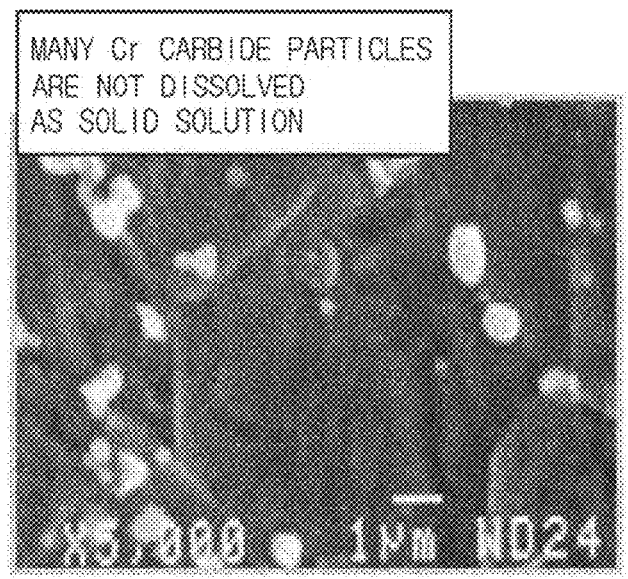
FIG. 11B shows a microstructure photograph when quenched at a lower temperature than the first embodiment of the present invention.
Figure 12:
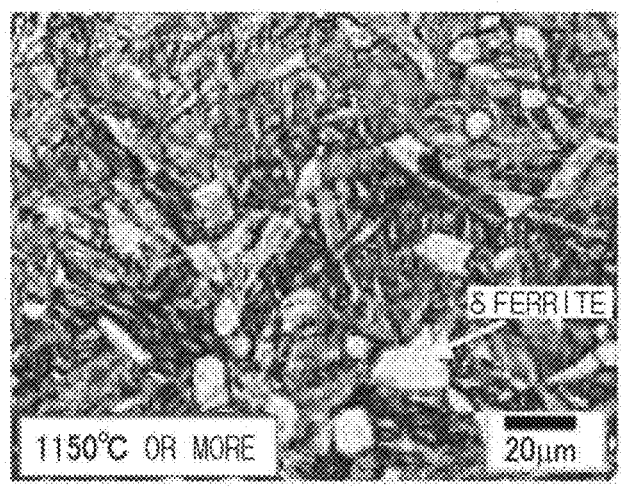
FIG. 12 shows a microstructure photograph when quenched at a higher temperature than the first embodiment of the present invention.

Next, the quenching temperature and the state of microstructure are described by referring to the drawings. Each of FIGS. 10A to 10E shows a quenching temperature and a microstructure photograph according to the first embodiment of the present invention. Each of FIGS. 11A and 11B shows a microstructure photograph when quenched at a lower temperature (less than 1,020° C.) than the first embodiment of the present invention, and FIG. 12 shows a microstructure photograph when quenched at a higher temperature (1,150° C. or more) than the first embodiment of the present invention. In FIGS. 10A to 10E, the state of the microstructure when the quenching temperature is varied from 1,030° C. to 1,140° C. is photographed at a magnification of about 400 times.

The surface is polished with #600 abrasive paper, further mirror polished using an alumina slurry and then etched with a mixed acid of ferric chloride+dilute sulfuric acid. The surface polishing method and the etching solution can be appropriately changed according to the condition of surface observation. In all of FIGS. 10A to 10E, a martensite form is shown. Growth of packets is clearly observed in the crystal grain boundary of initial austenite (austenite boundary). Growth of blocks seems to be insufficient. Further, in connection with packets, growth of the prior austenite crystal grain seems to be maximized in the temperature range of FIGS. 10B to 10D (quenching temperature: from 1,050 to 1,080° C.). As seen from the photographs, the size of the grown crystal grain is from 30 to 100 μm.

FIGS. 11A and 11B show microstructure photographs when quenched at less than 1,020° C., i.e., a lower temperature than the first embodiment of the present invention.

FIG. 11A shows an optical micrograph at a magnification of about 400 times, where neither packets nor blocks are grown and refining takes place. The crystal grain does not have an uneven, so-called granular, contour but looks flat.

In FIG. 11B, the magnification of the electron micrograph of FIG. 11A is increased to 5,000 times. In the photograph, many Cr carbide particles not dissolved as solid solution but recognized as a white sphere with a size of about 1 μm are observed.

This Cr carbide is considered to inhibit the growth of packets and bring about formation of a fine crystal grain.

That is, when Cr is dissolved as solid solution without precipitating inside the grain boundary of prior austenite, well grown packets are believed to be observed. It is understood from the photograph that when quenched at 1,020° C. or less, the size of the prior austenite crystal grain is less than 30 μm.

FIG. 12 shows a microstructure photograph when quenched at high temperature of 1,150° C. or more, i.e., a higher temperature than the first embodiment of the present invention. In FIG. 12 that shows an optical micrograph at a magnification of about 400 times, large δ ferrite is observed. As described above, when δ ferrite exists, Cr carbide precipitates at the interface to reduce the Cr concentration and produce a deficiency layer and therefore, corrosion resistance is deteriorated.

In this way, in the present invention, the quenching temperature is specified to fall in an appropriate range, whereby Cr is surely dissolved as solid solution inside the crystal grain to restrain the precipitation of Cr carbide in the grain boundary and at the same time, prevent the generation of δ ferrite. If the quenching temperature is lower than the appropriate range, the crystal grain size is less than 30 μm, though this is hard to find because packets are not grown, and if the quenching temperature is higher than the appropriate range, the size of characteristically existing δ ferrite is also 20 μm or less, revealing a distinct difference from the conditions of the crystal grain in the case of the present invention shown in FIGS. 10A to 10E.

Figure 13:
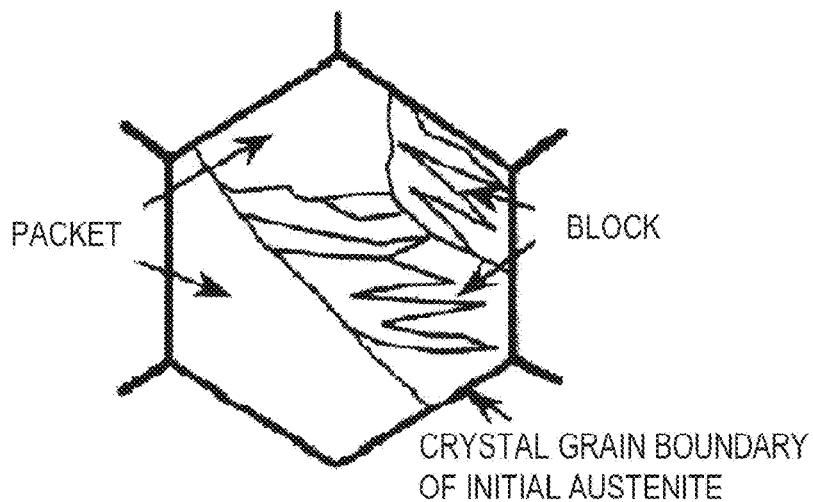
FIG. 13 is a structural schematic diagram of lath martensite according to the first embodiment of the present invention.

The lath martensite of the present invention is described by referring to FIG. 13. In FIG. 13, the surrounding boundary is the crystal grain boundary of initial austenite, and in the prior austenite grain, packets and blocks are observed. The block is an aggregate of laths having the same crystal orientation and looks acicular, and an aggregate of blocks is referred to as a packet. Although N may little affect the width of the block, the width of the block seems to decrease with an increase of C. In any case, it is confirmed in the present invention that when appropriate quenching is performed, a characteristic microstructure configuration emerges. The packet size affects the properties such as toughness but in the present invention, the packet size is considered to be utilizable for judgment of appropriate composition/proper heat treatment of a mechanical component formed of the martensitic stainless steel.

Figure 14:
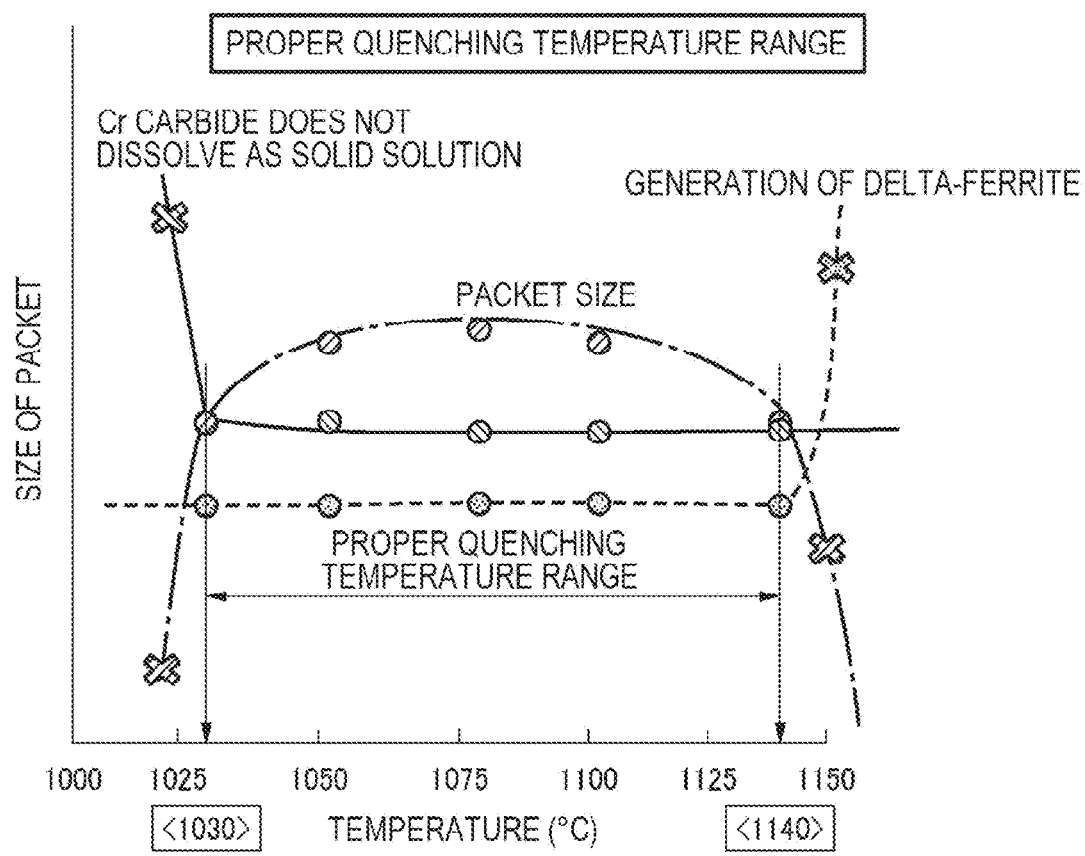
FIG. 14 is a schematic diagram showing the proper quenching temperature range according to the first embodiment of the present invention.

FIG. 14 is a schematic diagram showing the proper quenching temperature range for the composition of the martensitic stainless steel in the first embodiment of the present invention and is a schematic diagram where the crystal grain size (growth of packet), the generation of Cr carbide and the generation of δ ferrite are put in order with respect to the quenching temperature.

In FIG. 13, it is observed that the prior austenite crystal grain grows and packets are thereby well grown. Conversely, when packets grow to provide a microstructure where the prior austenite crystal grain size reaches the range of 30 μm to 100 μm, the quenching is considered to be performed at a proper quenching temperature ranging from 1,030° C. to 1,140° C.

If the quenching is performed at a temperature less than the quenching temperature range above, as described above, growth of the prior austenite crystal grain is restrained by Cr carbide, allowing the progress of refinement, and the prior austenite crystal grain size becomes less than 30 μm.

Similarly, if the quenching is performed at a temperature higher than the quenching temperature range above, not only the generation of δ ferrite is observed but also the packets are not grown, as a result, the prior austenite crystal grain size becomes less than 30 μm.

Accordingly, it is considered that quenching performed in a proper temperature range and growth of packets to provide an prior austenite crystal grain size of 30 μm to 100 μm are inextricably linked. In addition, with regard to the quenching temperature and the crystal grain growth in the present invention, as described above, the quenching temperature range of 1,050 to 1,080° C. where growth of packets is more promoted, is considered to be a more preferred quenching temperature range.

The corrosion resistance is described below. The corrosion resistance of a stainless steel is indicated by pitting index PI (Pitting Index=Cr+3.3 Mo+16N) and known to have a correlation with the pitting potential. As a representative stainless steel having high corrosion resistance, austenitic stainless steel SUS304 is known, and the PI value thereof is from 18.0 to 20.0 according to the Cr content.

In the martensitic stainless steel, the corrosion resistance is known to be enhanced by Mo or N and well agrees with the above-described PI value. It is also known that with a PI value of about 18 or more, the steel shows a pitting potential at the SUS304 level.

However, if δ ferrite exists, even when the PI value is high, the corrosion resistance (pitting potential) is significantly reduced.

For this reason, in addition to achieving a PI value at the SUS304 level, it may be important not to allow for generation of δ ferrite.

According to the present invention, the generation of δ ferrite can be suppressed by performing the quenching and subzero treatment in appropriate temperature ranges, so that a pitting potential consistent with the PI value can be obtained and high corrosion resistance can be ensured.

Figure 15:
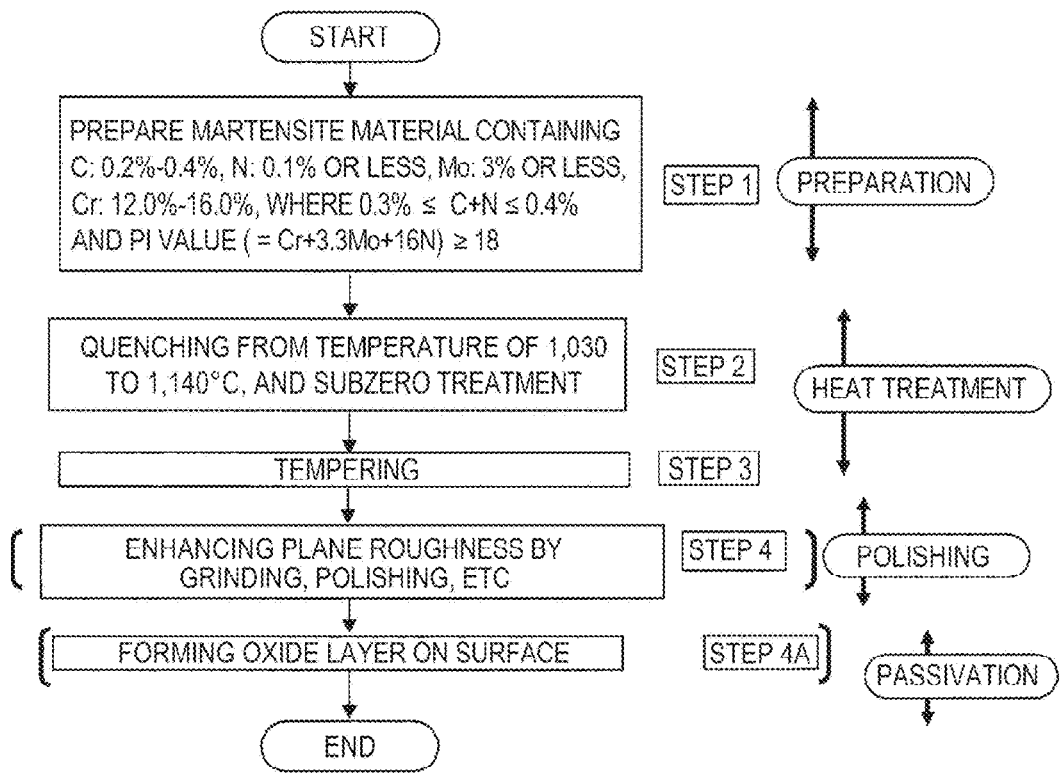
FIG. 15 is a flow chart of the manufacturing method of a mechanical component according to the first embodiment of the present invention.

The manufacturing flow in the present invention is described below. FIG. 15 is a flow chart of the manufacturing method of a mechanical component according to the first embodiment of the present invention.

The method includes steps 1, 2, 3, 4 and 4A, specifically, a step 1 of preparing a material, a step 2 of quenching and a subzero treatment, a step 3 of tempering, a step 4 of enhancing the plane roughness by grinding or polishing, and a step 4A of forming an oxide layer on the surface to achieve passivation. The steps 2 and 3 are collectively referred to as a heat treatment.

The steps 4 and 4A are parenthesized, and this indicates that these steps may be omitted.

The step 1 is a step of preparing the martensitic stainless steel according to the present invention, where the shape of a predetermined mechanical component is machined in advance by a processing machine such as lathe, milling cutter and machining to prepare a member. The shape is machined to have a polishing margin, a grinding margin, etc. so as to remove/correct warpage, deformation, surface texture roughness or fouling (dent), which generally occurs in association with heat treatment.

In the present invention, warpage, deformation, etc. due to quenching is small and within a tolerance level and does not exceed the required accuracy, so that a machining margin such as polishing margin or grinding margin can be minimized.

In the step 2, as described above, quenching is performed from a temperature of 1,030° C. to 1,140° C. in a vacuum furnace, etc. to develop lath martensite that is imparted with a predetermined hardness and free of existence of harmful δ ferrite.

According to the step 2, a predetermined hardness or metal microstructure can be provided to the mechanical component. Specifically, a predetermined lath martensite microstructure can be realized. The mechanical component has an austenite microstructure at the quenching temperature, undergoes martensite transformation along with cooling, and comes to have a lath martensite microstructure with high hardness.

The heat treatment furnace for quenching is not particularly limited, but the quenching can be sufficiently performed in a commonly-employed vacuum furnace.

At the time of cooling, warpage or deformation of the mechanical component based on strain is known to occur because temperature non-uniformity during cooling generally causes a difference in the timing of when transformation to martensite is permitted. Therefore, it may be also important to confirm the conditions, for example, the mass/shape of the mechanical component, the thermal properties (heat capacity, cooling capacity) of the heat treatment furnace, and the charged amount (mass).

Following the quenching step, a subzero treatment is performed. The martensite transformation by quenching is completed at a temperature higher than ordinary temperature, but retained austenite sometimes exists depending on the amount of (C+N). As is known, the existence of retained austenite not only decreases the hardness of martensite but also allows for progress of transformation to martensite with aging. A change in volume occurs due to difference in the crystal structure (FCC/BCC) between austenite and martensite and therefore, in the mechanical component, the dimension may be changed or the shape may be distorted.

For this reason, the content of retained austenite is preferably reduced sufficiently.

The retained austenite is caused also by increase of C+N in alloy components, though its content varies depending on the decrease in the martensite transformation start temperature (Ms), the cooling rate, etc. Therefore, in order to more stabilize the mechanical component, reduction in the retained austenite content is effective, and the retained austenite content can be surely reduced by performing a subzero treatment following the quenching.

In this way, when a subzero treatment is performed, generation of retained austenite can be restrained by (C+N) of about 0.28%. The effect of reducing the generation of retained austenite is observed even at (C+N) of 0.4%, and the hardness can be made to fall in the range of 58 to 62 HRc. In addition, the retained austenite is reduced to about 7% which is lower than 10% that is considered to scarcely exert an adverse effect.

The step 3 is a step of imparting predetermined toughness to the mechanical component caused to assume martensite of high hardness by quenching, and removing strain to achieve stabilization. When the tempering temperature is raised, the hardness decreases. The tempering includes low-temperature tempering performed at a relatively low temperature of around 200° C. for imparting toughness by giving priority to the hardness, and a high-temperature tempering performed at around 600° C. so as to impart high toughness. In the present invention, with a view to application of the mechanical component to a bearing, the tempering is performed at a relatively low temperature of 300° C. or less, specifically 150° C., preferably 150° C.±10° C., by placing priority on the hardness.

In the case of a mechanical component requiring higher toughness, tempering may also be performed at a high temperature of around 600° C. In this case, it is necessary to pay attention/consideration, because hardness decreases. By this step 3, the manufacturing flow of the mechanical component according to the first embodiment of the present invention may be terminated.

As the step 4 following the tempering of the step 3, a step of enhancing the plane roughness by grinding or polishing the surface of the mechanical component is described.

It is known that when the metal surface is roughened, the surface area is increased, and, for example, in the case of an aluminum foil, etc. of an electrolytic capacitor, when the surface is roughened, the actual surface area can be increased by as large as 3 times the projection plane to increase the electrostatic capacity. In other words, the actual surface area relative to the projection area can be reduced by enhancing the plane roughness of the surface. As described above, when the crystal grain size is refined, the length/area of the grain boundary working out to an origin of rust formation increases, and also in this case, enhancement of the plane roughness of the surface similarly makes it possible to prevent an increase in the actual surface area and in turn, reduce the area of the interface working out to an origin of rust formation. Since the step 3 is already terminated, the heat treatment is completed, and the hardness of the mechanical component is increased. Accordingly, machining by an ordinary cutting tool, etc. is difficult. In addition, enhancement of the plane roughness cannot be expected so much in the machining using a cutting tool, etc., where a large removal quantity is produced. Then, the plane roughness of the surface of a mechanical part having high hardness can be enhanced by grinding or polishing by means of a grindstone, a slurry, etc. Other than grinding or polishing, a working method capable of enhancing the plane roughness of the surface having high hardness, such as barrel processing, vanish processing or electropolishing, can also be appropriately used.

The step 4A, i.e., a step of forming an oxide layer on the surface, is described below. Following the quenching of the step 3, the step 4 is performed, if desired, and thereafter, a step of forming an oxide layer on the surface is performed as the step 4A.

The stainless steel is known to have high corrosion resistance by virtue of a Cr oxide layer, and this step is a step of more aggressively constructing the oxide layer to impart higher corrosion resistance. That is, the surface is passivated by covering the surface of the mechanical component with a hard oxide layer. The Cr oxide film has, when produced in air, a very small thickness of about 5 nm, but a strong oxide layer can be constructed by an oxidizing nitric acid. In this case, it is supposed that an oxide film having a thickness as large as about two times, i.e., about 10 nm, can be formed.

The passivation treatment is a treatment of immersing a product in a solution containing a 5% to 40% $HNO_3$ solution as the base and having added thereto, if desired, a small amount of an oxidizing agent such as hydrogen peroxide, permanganic acid and chromic acid, at a temperature ranging from ordinary temperature to 70° C.

Further, when the surface is electropolished in advance of the step of performing the passivation treatment with nitric acid, the corrosion resistance can be more enhanced. This is considered to occur because in addition to reduction in the interface area in the step 4, sharp parts of the surface are preferentially removed to provide a smooth surface.

Moreover, because, Fe in the surface area elutes during electropolishing, and the surface comes to have a Cr-rich composition. As a result, the composition becomes a composition in which the corrosion resistance is higher closer to the surface. In the martensitic stainless steel of the present invention, Mo known as an element providing functional enhancement of the passive film is contained and can assist also in the self-repair of Cr oxide film to increase the corrosion resistance.

Figure 16:
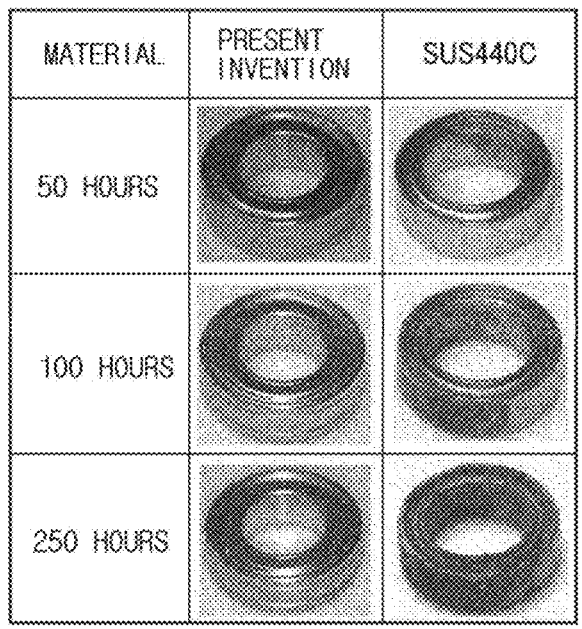
FIG. 16 shows a photograph of results of a corrosion resistance test (salt water spray) according to the first embodiment of the present invention.

The evaluation of the corrosion resistance is described by referring to FIGS. 16 and 17. FIG. 16 shows a photograph of results of a salt water spray as the corrosion resistance test according to the first embodiment of the present invention, and FIG. 17 shows a photograph of results of a CASS test as the corrosion resistance test according to the first embodiment of the present invention. A rolling bearing is used as the evaluation target. As for the ring of the bearing, the tests were performed using a ring according to the present invention and a ring formed from SUS440C that is frequently used in the rolling bearing.

First, the salt water spray test was performed in conformity with JIS Z 2371 (neutral salt water spray test). Sodium salt at a concentration of 50±5 g/L was used as the spray liquid, and the test was conducted under the conditions of pH=6.5 to 7.2, temperature: 35° C.±2° C., and spray amount: 1.5±0.5 mL/H. Photographs of the outer appearance after 50 hours, 100 hours and 250 hours are depicted. In the bearing according to the present invention, rust formation was not confirmed even after passing 250 hours, but in the bearing formed from SUS440C, wet rust was observed in the inner and outer rings after 100 hours, and the entire bearing was rusted heavily after 250 hours. Thus, high rust prevention effect according to the present invention can be confirmed.

Subsequently, the CASS (Copper accelerated acetic Acid Salt Spray test) test was performed in conformity with JIS Z 2371 (CASS test). A mixed solution of sodium chloride at a concentration of 50±5 g/L and copper(II) chloride at 0.205±0.015 g/L was used as the spray liquid, and the test was conducted under the conditions of pH=3.1 to 3.3 (acidic with acetic acid), temperature in spray room: 50° C.±2° C., and spray amount: 1.5±0.5 mL/H. Photographs of the outer appearance after 50 hours, 100 hours, and 250 hours are depicted. The CASS test is a harsher test than the salt water test, and in the bearing according to the present invention, rust formation was not confirmed in the ring portion even after 250 hours.

In the shield plate made of SUS304 of an austenite stainless steel and disposed between inner and outer rings, a slight color change was observed. According to these test results, the corrosion resistance is higher than that of SUS304 believed to have a high rust prevention effect. In the bearing of SUS440C, wet rust was observed in the inner and outer rings after 50 hours. After 250 hours, the entire bearing was rusted without a gap, and the surface of the bearing itself could not be recognized. In the shield plate, heavy rust was also confirmed as if as catching rust. Thus, high rust prevention effect in the ring according to the present invention can be confirmed.

Figure 18A:
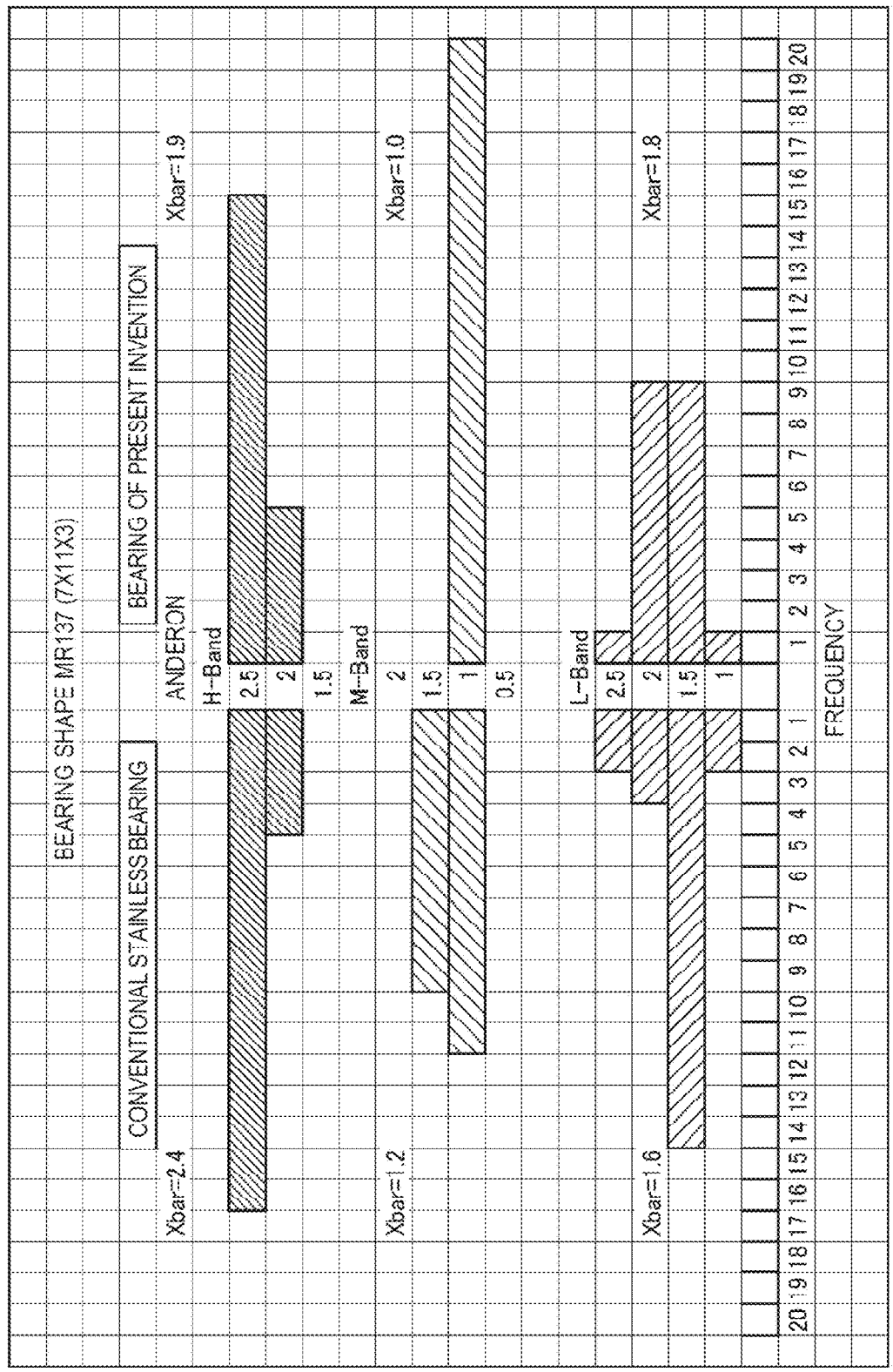
FIG. 18A is an acoustic characteristic diagram of a rolling bearing according to the first embodiment of the present invention.
Figure 18B:
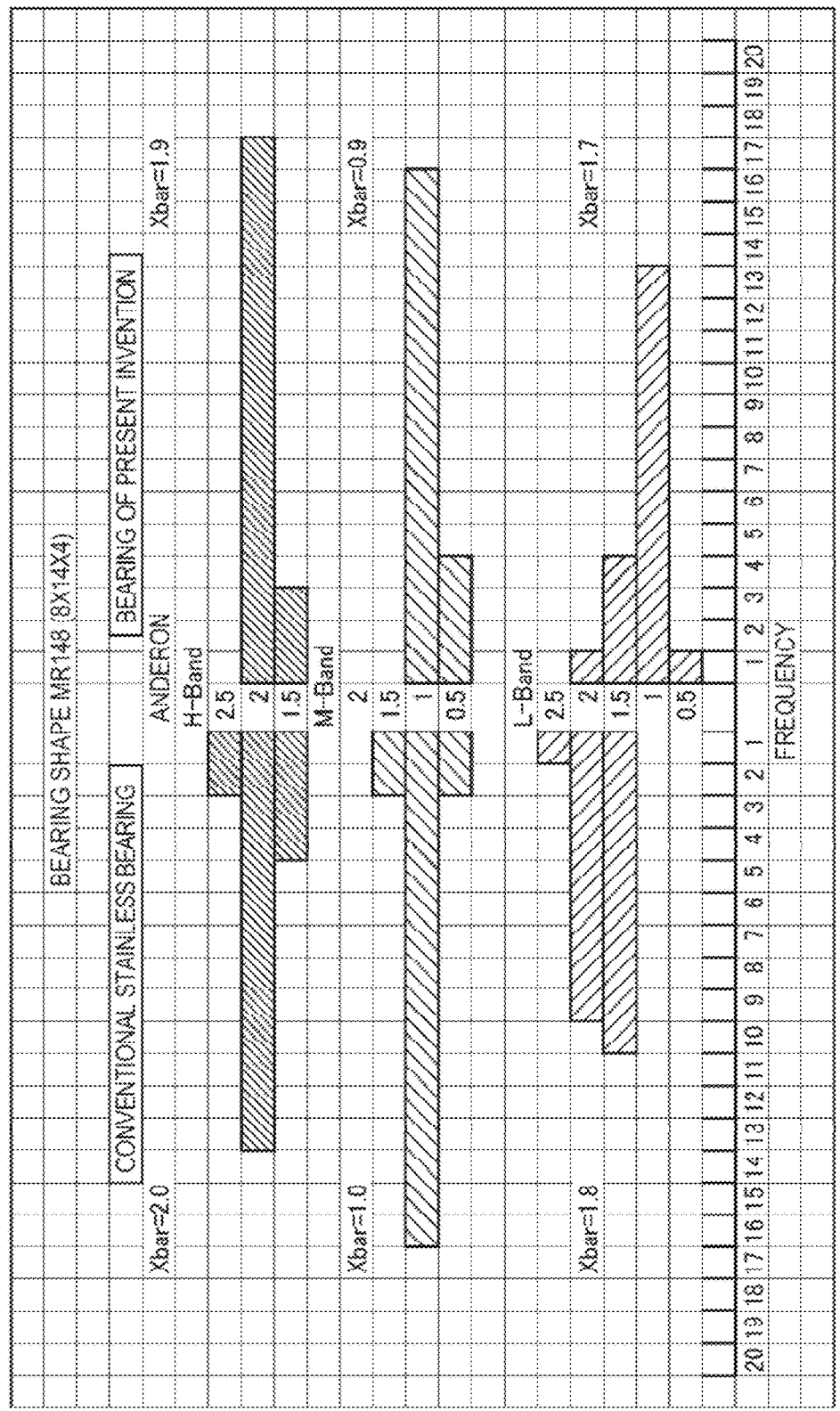
FIG. 18B is an acoustic characteristic diagram of a rolling bearing according to the first embodiment of the present invention.

The acoustic properties of the rolling bearing using the martensitic stainless steel of the present invention is described by referring to FIGS. 18A and 18B. FIGS. 18A and 18B respectively show the frequency distributions obtained for rolling bearings of the present invention and SUS440C as a conventional Comparative Example, specifically, by measuring the anderon value on 20 rolling bearings each of MR137 ($\varphi 13 \times \varphi 7 \times W4$) and MR148 ($\varphi 14 \times \varphi 8 \times W4$). Although detailed description is omitted, data of the bearing according to the present invention and data of the bearing according to the conventional example are shown respectively on the right side and the left side of the graph by the frequency of measurement value at each of the frequency bands L, M and H in this order from the lower side. In any mode, the acoustic properties of the bearing according to the present invention were comparable to those of the conventional product, and at some bands, the bearing was quieter than the conventional product.

The martensitic stainless steel has been enhanced by refining the carbide so as to improve the acoustic properties, but in the grown crystal grain of the present invention, Cr and C are well dissolved as a solid solution, and this is considered to bring about acoustically good results.

Second Embodiment

A straight shaft according to a second embodiment of the present invention is described below.

The shaft is a bar material with a required diameter formed by drawing and is finished to $\varphi 4 \times 60$ by lathe turning. This shaft is assumed to be a press-fit pin for exchangeably fixing a member (not shown), as an example of the mechanical component used in a saltwater splashing environment. If the pin cannot be removed due to rust formation, the member cannot be replaced. Therefore, the press-fit pin is demanded to have high corrosion resistance.

Then, it is confirmed whether the corrosion resistance is improved by enhancing the plane roughness of the surface of the pin according to the step 4 of the present invention.

As for the conditions of the shaft, in the method shown in FIG. 15, the steps 1, 2 and 3 are the same, and 2 levels of performing and not performing the step 4 are set. The step 4A of forming an oxide layer to the surface is not performed. The bar material is finished to a surface roughness Ra of about 0.65 by lathe turning. In the step 4, the plane roughness is enhanced to a surface roughness Ra of about 0.1 by centerless polishing. Other conditions are the same.

The test is performed by the method in conformity with JIS Z 2371 under the same conditions as in the salt water spray test, and a photograph after passing 250 hours is depicted for comparison. In the right shaft by only lathe turning (the surface roughness is not enhanced), formation of spot rust like fog is slightly observed in the upper part. On the other hand, in the left shaft where the surface roughness is enhanced, rust formation is not observed. In this way, the corrosion resistance is considered to be improved by enhancing the surface roughness.

This is thought to be achieved because the actual surface area can be reduced by enhancing the plane roughness of the shaft surface and according to decrease in the area of the interface working out to an origin of rust formation, the corrosion resistance is improved.

Third Embodiment

As a third embodiment of the present invention where so-called passivation of forming an oxide film to the surface is performed, the corrosion test of the bearing is described by referring to FIG. 20. The bearings in FIG. 20 are depicted to compare the difference between when the step 4A of forming an oxide film on the surface is performed or when not performed, by the different after 350 hours in the CASS test.

Other steps 1, 2, 3 and 4 are conducted in the same manner.

In the left bearing, the passivation is performed by immersion in a liquid based on oxidizing nitric acid ($HNO_3$). The nitric acid concentration, the treatment temperature/time, etc., and as for the treatment liquid, use of a mixed acid such as nitric acid-chromic acid or nitric acid-permanganic acid, may be appropriately selected. In this experiment, the bearing is immersed in 12% $HNO_3$ to achieve passivation by a Cr oxide film on the surface.

In the right bearing without passivation, dullness is slightly observed in the inner diameter part of the inner ring. In the left bearing, dullness is not observed and the surface is clear. Although a difference in the corrosion resistance by passivation is recognized, as understood from the results of the CASS test, both bearings have fairly good corrosion resistance.

It is considered that on the passivated surface, Fe is eluted by an action of the oxidizing nitric acid to form a Cr-rich layer and the corrosion resistance is thereby more enhanced.

Fourth Embodiment

Figure 21:
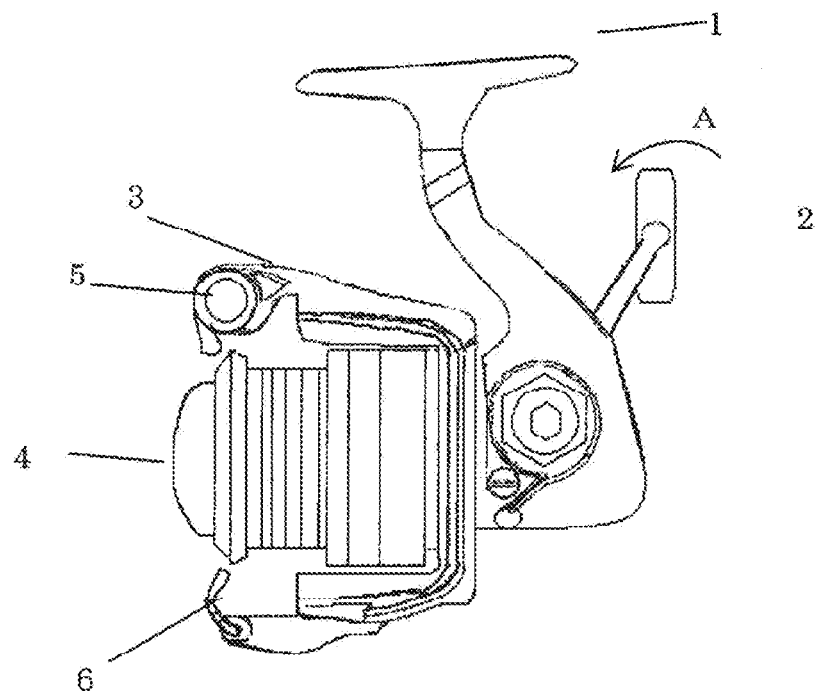
FIG. 21 is an external view of a fishing gear according to a fourth embodiment of the present invention.

As a fourth embodiment of the present invention, a reel in a fishing gear, which is a rotating device using the rolling bearing, is described by referring to FIG. 21. In this embodiment, the reel is a so-called spinning reel. A reel body 1 is used by attaching it to a fishing pole referred to as a rod, etc. (not shown). A handle 2 is rotated in the A direction, and a rotor 3 is thereby rotated relative to a spool 4 on which a line is wound. In the rotor 3, a curved bar-like member referred to as a bail 6 and a line roller 5 for guiding a fishing line (not shown) referred to as a line are provided so that the line can be wound on the spool 4. In the inside (not shown) of the reel, two rolling bearings according to the third embodiment of the present invention are used. Further, a mechanical component with enhanced plane roughness, which is the same as the second embodiment of the present invention, is used for the line roller 5.

This type of reel is often used for throwing fishing from a sandy beach and therefore, is exposed to a saltwater splashing environment. In addition, at the time of winding up the line, the surface of the line roller 5 is attacked by sand attached to the line as if it is an abrasive. Thus, the line roller 5 is subject not only to chemical attack by salt water but also to mechanical attack by sand. According to the present invention, the line roller can be constructed as a bulk material having a high surface hardness and high corrosion resistance. A line roller where plating is applied to the base metal has a problem with the corrosion resistance, because the plating is readily damaged to cause rust formation. Compared to these, according to the present invention, a line roller with high hardness and good corrosion resistance can be realized at a low cost. Since the corrosion resistance is high, the maintenance can be more easily performed than before.

Fifth Embodiment

While the fourth embodiment is described by taking a rolling bearing as an example, a rolling bearing unit including a housing, one or more rolling bearings, and a hollow shaft also falls within the scope of the present invention. The rolling bearing unit requiring corrosion resistance includes, for example, those incorporated into a device used in an air turbine of a dental handpiece, a fan for blowing air to an air electrode of a fuel cell, etc., and a multicopter operated in a corrosive gas atmosphere such as crater and hot-spring area. The rolling bearing unit is integrated by adhesion, press fitting or other methods while applying a precompression to one or more rolling bearings. Therefore, at the time of exchanging the rolling bearing, the client exchanges each of the rolling bearings individually while adjusting the preload, but according to the present invention, this cumbersome operation becomes unnecessary.

Sixth Embodiment

Figure 22A:
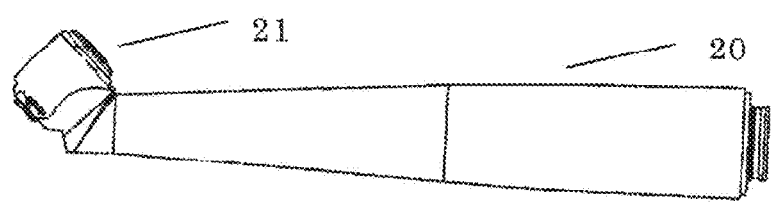
FIG. 22A is a main external view of a handpiece according to a fifth embodiment of the present invention.
Figure 22B:
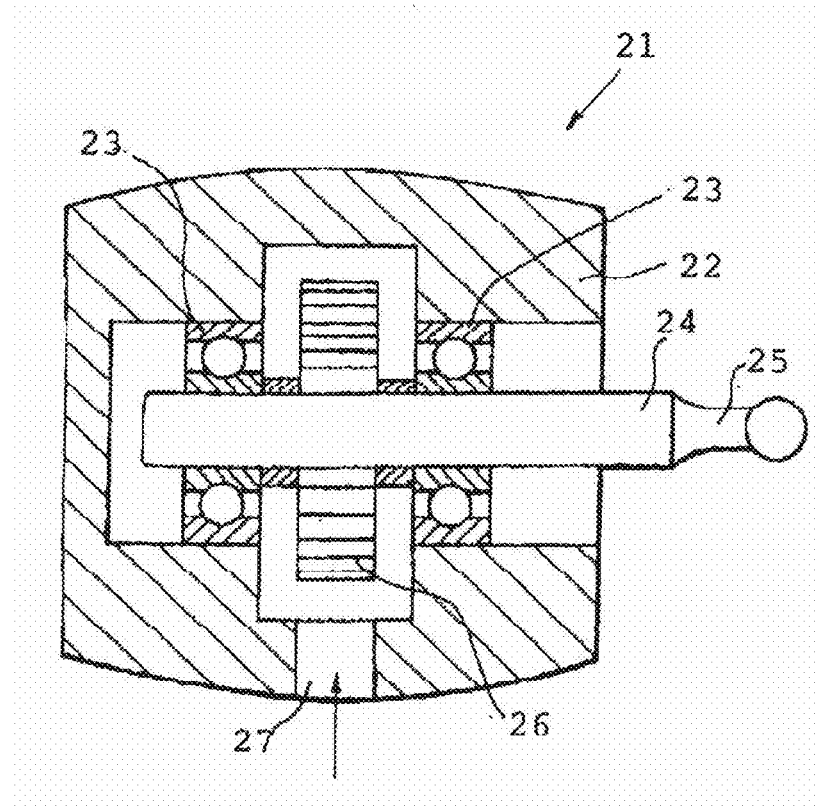
FIG. 22B is a main part cross-sectional view of a handpiece according to the fifth embodiment of the present invention.

A dental handpiece according to a sixth embodiment of the present invention is described below by referring to FIGS. 22A and 22B. FIG. 22A shows a distal end portion 21 of a dental handpiece 20 as the rotating device according to this embodiment. The distal end portion 21 is present at the tip of a tapered part continuing from a straight grip part and being inserted into oral cavity.

In the center axis part of a housing 22, a rotary shaft 24 is rotatably supported via rolling bearings 23 and 23 described in the third embodiment of the present invention, and a tool 25 for medical treatment, such as grinder or drill, is detachably mounted on the distal end of the rotary shaft 24. A turbine blade 26 is integrally, rotatably and fixedly attached to the rotary shaft 24. The turbine blade 26 undergoes high-speed rotation under an action of air supplied from a gas supply part (introduction passage) 27 provided on the housing 22, and the rotation speed thereof reaches 300,000 revolutions per minute or more.

The stable high-speed rotation of the rotary shaft 24 is greatly governed by the performance of the rolling bearings 23 and 23. The mode of the rolling bearing 23 is not particularly limited, but a rolling bearing capable of receiving both radial load and axial load may be used, and representative examples thereof include an open-type deep-groove ball bearing and an open-type angular ball bearing. Incidentally, bearings with or without a cage can be used differently, and in addition to a bearing shielded at both sides, a bearing shielded at one side may also be used depending on use conditions.

In the present invention, at least one of inner and outer rings and a rolling element is made of the martensitic stainless steel described in the first embodiment. The rolling element may also be made of the martensitic stainless steel described in the first embodiment but is preferably ceramic-made, and a rolling element manufactured by the microball granulation method disclosed in JP-A-6-108117 is preferred. In the case of granulation method, as for the material of the microball, microparticles obtained by grinding a block-shaped ingot and sieving the ground product are spheroidized, and the resulting spheres are semi-sintered, sieved, thereby sorted to a given size range and used as a primary material. This primary material is used as a core, and a deposition layer is formed therearound from a raw material powder that is additionally supplied. Subsequently, the primary material having formed thereon the deposition layer is semi-sintered to obtain grown particles, and the grown particles obtained are sieved, thereby sorted to a given size range, and then sintered, whereby a microball material is obtained.

When the rolling element is a ceramic-made rolling element, the wear resistance and the baking resistance are enhanced, and a long-time operation becomes possible even when the amount of a lubricant supplied is reduced. In addition, the specific gravity of a ceramic ball is smaller than that of a stainless steel ball, and this allows for higher rotation, as a result, the tooth cutting performance by a dental handpiece is increased.

From the aspect of a measure against noise generated by a handpiece, the stainless steel ball has a problem of noise generation due to contact with a race, i.e., contact between metals, but in the case of a ceramic ball, the contact is a contact between members formed of dissimilar materials and therefore, the sound is quiet.

The cage is also not particularly limited, and in addition to a crown-type cage, any of a pressed cage, a machined cage, a molded cage, a pin-type cage, etc. may be used. The material of the cage may be a stainless steel, a ceramic material, or a resin composition.

The handpiece is subject to, for example, contamination by bleeding, etc. in oral cavity and therefore, is sterilized after use. Usually, high-temperature high-pressure steam sterilization (autoclaving) is performed. According to this embodiment, the rolling bearing has high corrosion resistance enough to withstand the sterilization by autoclaving and therefore, the life of the handpiece can be extended. Incidentally, the bearing has high corrosion resistance to sterilization with free chlorine in sodium hypochlorite, etc., and therefore, this can be utilized, in addition to steam sterilization.

Free chlorine is used for sterilization in a water purification plant, and the bearing is also applicable to a member, etc. used in such a facility.

As for the similar corrosive environment, application to, for example, auxiliary machines such as pump or air blower for a fuel cell where formic acid and a highly reactive intermediate product are contained, or a fluidics member, a passage component, etc. applied to μ-TAS and the like, is also possible.

Figure 23:
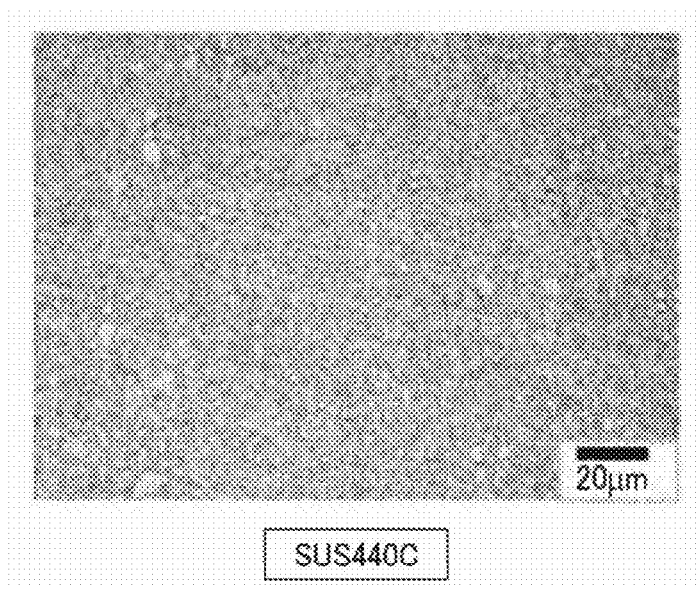
FIG. 23 shows a microstructure photograph of a conventional stainless steel bearing.

FIG. 23 shows a microstructure photograph at a magnification of 400 of SUS440C recited as a conventional example in the present invention. In FIG. 23, the crystal grain is refined to several μm or less, and white large specks observed here and there are Cr carbonitride and have a size of approximately 5 μm to 10 μm.

As described in the above, according to the present invention, C and N are well dissolved as a solid solution in a martensitic stainless steel to allow for growth of a crystal grain, so that a mechanical component with high hardness and good corrosion resistance can be realized. The contents disclosed in the embodiments can be appropriately changed.

While the present invention has been described in detail and with reference to specific embodiments thereof, it will be apparent to one skilled in the art that various changes and modifications can be made therein without departing from the spirit and scope of the present invention.

This application is based on Japanese Patent Application No. 2013-235002 filed on Nov. 13, 2013, the contents of which are incorporated herein by reference.

INDUSTRIAL APPLICABILITY

According to the manufacturing method of a mechanical component using the martensitic stainless steel specified in the present invention, a mechanical component having high surface hardness and excellent corrosion resistance can be realized, and due to such properties, the mechanical component can be applied to a shaft, a bearing, etc. used, for example, in a saltwater splashing environment. In addition, by using such a mechanical component, the corrosion resistance of a rotating device, etc. can be enhanced.

DESCRIPTION OF REFERENCE NUMERALS

1: Reel body
2: Handle
3: Rotor
4: Spool
5: Line roller
6: Bail
20: Handpiece
21: Distal end portion
22: Housing
23: Rolling bearing
24: Rotary shaft
25: Tool
26: Turbine blade
27: Gas supply part

The invention claimed is:

1. A rotating device which is a mechanical component made of a martensitic stainless steel having high hardness and high corrosion resistance and manufactured by a manufacturing method, the method comprising: a step of preparing a martensitic stainless steel containing, by mass %, C: 0.20% to 0.28%, N: 0.1% or less, Mo: 3% or less, and Cr: 12.0% to 16.0%, such that $0.3\% \leq C+N \leq 0.4\%$ and a PI value $(=Cr+3.3Mo+16N)$ is 18 or more, with the remainder of substantially Fe and unavoidable impurities; a step of quenching said steel from a temperature of 1,030 to 1,140° C. in a vacuum furnace; a step of a subzero treatment of said steel; and a step of tempering said steel at 150° C. or lower, so as to obtain a prior austenite crystal grain size of a surface layer of 30 μm to 100 μm and a surface hardness of 58 HRc to 62 HRc,
   wherein corrosion resistance is enhanced to enable the rotating device to be exposed to a corrosive environment.
2. The rotating device according to claim 1,
   wherein the corrosive environment is sterilization with free chlorine.

* * * * *